(12) United States Patent
Pundole

(10) Patent No.: US 11,870,621 B2
(45) Date of Patent: Jan. 9, 2024

(54) REMOTE DEVICE TELEMETRY AND COMMUNICATION

(71) Applicant: Faraidoon Pundole, Sugar Land, TX (US)

(72) Inventor: Faraidoon Pundole, Sugar Land, TX (US)

(*) Notice: Subject to any disclaimer, the term of this patent is extended or adjusted under 35 U.S.C. 154(b) by 0 days.

(21) Appl. No.: 17/780,122

(22) PCT Filed: Nov. 27, 2020

(86) PCT No.: PCT/US2020/062494
§ 371 (c)(1),
(2) Date: May 26, 2022

(87) PCT Pub. No.: WO2021/108762
PCT Pub. Date: Jun. 3, 2021

(65) Prior Publication Data
US 2022/0417066 A1 Dec. 29, 2022

Related U.S. Application Data

(60) Provisional application No. 63/093,944, filed on Oct. 20, 2020, provisional application No. 63/093,948, (Continued)

(51) Int. Cl.
*H04L 27/12* (2006.01)
(52) U.S. Cl.
CPC .................................... *H04L 27/12* (2013.01)
(58) Field of Classification Search
CPC ......... H04L 27/04; H04L 27/10; H04L 27/12; H04L 27/16
See application file for complete search history.

(56) References Cited

U.S. PATENT DOCUMENTS 5,852,630 A * 12/1998 Langberg ............ H04L 27/2647
375/219
10,079,699 B1 * 9/2018 Li ..................... H04L 25/03834
(Continued)

FOREIGN PATENT DOCUMENTS

WO  2018148616 A1  8/2018
WO  2021108762 A1  6/2021

OTHER PUBLICATIONS

International Preliminary Report on Patentability dated Jun. 9, 2022, PCT/US2020/062494 filed on Nov. 27, 2020.
(Continued)

*Primary Examiner* — Siu M Lee
(74) *Attorney, Agent, or Firm* — Andrew M. Metrailer; Conley Rose, P.C.

(57) ABSTRACT

Aspects of the disclosure provide for a method implemented by a control system for communicating with a remote device. In at least some examples, the method includes determining a frequency of operation of the remote device and determining whether the frequency of operation of the remote device varies from a programmed frequency. The method further includes determining a frequency scaling factor based on whether the frequency of operation of the remote device varies from a programmed frequency. The method further includes generating a frequency shift keying (FSK) signal, scaling the FSK signal to generate a frequency scaled shift keying (FSSK) signal, and transmitting the FSSK signal to the remote device.

18 Claims, 5 Drawing Sheets

Related U.S. Application Data filed on Oct. 20, 2020, provisional application No. 62/941,011, filed on Nov. 27, 2019, provisional application No. 62/941,014, filed on Nov. 27, 2019.

(56) References Cited

U.S. PATENT DOCUMENTS

| 10,764,097 B1* | 9/2020 | Rey ..................... H04L 27/144 |
| 2004/0022328 A1* | 2/2004 | Laamanen ............ H04L 27/227 |
| | | 375/354 |
| 2004/0218696 A1 | 11/2004 | Suissa et al. |
| 2010/0329195 A1 | 12/2010 | Abraham et al. |
| 2014/0003823 A1 | 1/2014 | Roberts et al. |
| 2018/0131234 A1 | 5/2018 | Uchimoto |

OTHER PUBLICATIONS

International Search Report and Written Opinion dated Apr. 1, 2021, PCT/US2020/062494 filed on Nov. 27, 2020.

\* cited by examiner

US 11,870,621 B2

REMOTE DEVICE TELEMETRY AND COMMUNICATION

CROSS-REFERENCE TO RELATED APPLICATIONS

This application is a filing under 35 U.S.C. 371 as the National Stage of International Application No. PCT/US2020/062494, filed on Nov. 27, 2020, entitled, "REMOTE DEVICE TELEMETRY AND COMMUNICATION," which claims the benefit of and claims priority to: 1) U.S. Provisional Patent Application No. 62/941,011, which was filed Nov. 27, 2019, and is titled "Safety Sub,"; 2) U.S. Provisional Patent Application No. 63/093,944, which was filed Oct. 20, 2020, and is titled "Safety Sub,"; 3) U.S. Provisional Patent Application No. 62/941,014, which was filed Nov. 27, 2019, and is titled "Downhole Communication Systems and Methods,"; and 4) U.S. Provisional Patent Application No. 63/093,948, which was filed Oct. 20, 2020, and is titled "Downhole Communication Systems and Methods," each of which is hereby incorporated herein by reference in its entirety for all purposes.

BACKGROUND

Oil and gas tools are used to complete oil and gas wells by performing certain tasks inside a well bore at a certain depth in order to facilitate the flow of hydrocarbons into the wellbore. Such operations involve multiple tools at different producing zones at different depths where it may be required to control distinct functions separately. These tools are usually brought to the producing zone(s) by wireline, tubing or downhole tractors.

Similarly, various other types of tools used in industries such as mining, demolition, pyrotechnics, and the like also rely on the operation of several types of tools in series. While these tools are not disposed within a wellbore, they are often arranged over large distances to place the user at a distance from the tools.

SUMMARY

Aspects of the disclosure provide for a method implemented by a control system for communicating with a remote device. In at least some examples, the method includes determining a frequency of operation of the remote device and determining whether the frequency of operation of the remote device varies from a programmed frequency. The method further includes determining a frequency scaling factor based on whether the frequency of operation of the remote device varies from a programmed frequency. The method further includes generating a frequency shift keying (FSK) signal, scaling the FSK signal to generate a frequency scaled shift keying (FSSK) signal, and transmitting the FSSK signal to the remote device.

Other aspects of the disclosure provide for a control system. In at least some examples, the control system includes a microcontroller including a memory and executable code stored as firmware in the memory. When executed by the microcontroller, the executable code configures the microcontroller to generate a FSK signal including a command for a remote device. The executable code further configures the microcontroller to condition the FSK signal according to operating characteristics of the remote device and characteristics of a communication channel coupling the control system to the remote device to generate a conditioned FSK signal. The executable code further configures the microcontroller to transmit the conditioned FSK signal to the remote device via the communication channel.

Other aspects of the disclosure provide for a remote device. In at least some examples, the remote device includes an electrically erasable programmable read-only memory (EEPROM), a microcontroller including a memory and coupled to the EEPROM, and executable code stored as firmware in the memory. When executed by the microcontroller, the executable code configures the microcontroller to receive power from a wireline coupled between a control system and the remote device, read a switch state from the memory and from the EEPROM, and determine whether the switch state read from the memory matches the switch state read from the EEPROM. The executable code further configures the microcontroller to control a switch to have the switch state when the switch state read from the memory matches the switch state read from the EEPROM match and fail to a safe state by controlling the switch to have a switch state of off when the switch state read from the memory does not match the switch state read from the EEPROM match.

Other aspects of the disclosure provide for a method. In at least some examples, the method includes reading a switch state from redundant memory locations and determining whether the switch state read from the redundant memory locations matches. The method also includes controlling a switch to have the switch state when the switch state read from the redundant memory locations matches. The method also includes failing to a safe state by controlling the switch to have a switch state of off when the switch state read from the redundant memory locations does not match.

Other aspects of the disclosure provide for a remote device. In at least some examples, the remote device includes a battery, a microcontroller including a memory and adapted to receive power from the battery, and executable code stored as firmware in the memory. When executed by the microcontroller, the executable code configures the microcontroller to determine that a predetermined period of time has elapsed since the microcontroller received power via a physical coupling to a control system and control a switch to have a switch state of off responsive to the determination that the predetermined period of time has elapsed.

DETAILED DESCRIPTION

Figure 1:
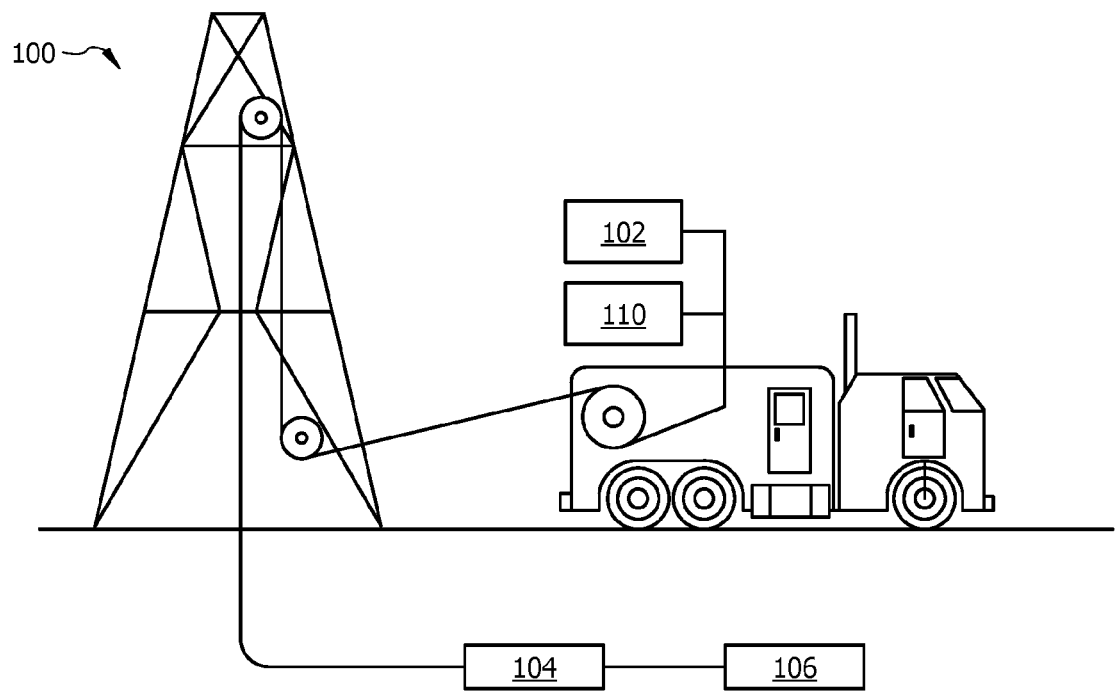
FIG. 1 is a diagram of an example system in accordance with various examples.

Various devices are implemented remote to a user or controller of the remote devices. However, for the user to maintain control of a remote device, a control system in proximity to the user maintains communicative connectivity to the remote device. In some examples, the connectivity is implemented as a wireline or physical connection, providing reliable communication between the control system and the remote device. In at least some examples, the wireline is of a length such that losses or other alterations to a signal transmitted on the wireline occur between opposite ends of the wireline. Also in at least some examples, the wirelines passes through, or into, an environment such that losses or other alterations to a signal transmitted on the wireline occur between opposite ends of the wireline (e.g., such as when the wirelines passes through, or into, areas having vastly varying temperatures between opposite ends of the wireline).

In various examples, the remote devices are control and/or telemetry devices. One such control device is a switch circuit for controlling a flow of current to a downstream device for which the switch is an intermediary between the downstream device and the control device. The switch circuit is, for example, a safety circuit that prevents an unintentional passage of current between input and output terminals of the switch circuit. In this sense, the switch circuit is, in some examples, implemented as a blocking device to block the transfer of power between two points coupled to respective input and output terminals of the switch circuit. The switch circuit may also include at least some telemetry functionality. For example, the switch circuit may capture and transmit voltage, current, temperature, or other measurements to the control system. Such remote devices may be implemented in situations in which it is advantageous, or preferred, for the user to remain physically distant from the remote devices. For example, a remote device may be implemented between a user and a downstream tool or device that is a detonation charge, such as in mining, demolition, wellbore perforation, or other situations in which it may be dangerous or disadvantageous for a user to be in proximity of the detonation charge. In other examples, the remote device may be implemented between the user and a downstream tool that is not inherently dangerous such as a detonation charge, but is located inconveniently for facilitating physical proximity of the user to the downstream device.

In a particular implementation example, a perforating gun is selectively disposed and used inside a wellbore to facilitate a flow of hydrocarbons into the wellbore. For example, the perforating gun directs an explosive charge into a casing of the wellbore in one or more locations, perforating the casing in at least some of the one or more locations and facilitating the flow of hydrocarbons into the wellbore through the perforations in the casing of the wellbore. While the example of a perforating gun, a wellbore, and more generally oil field uses and implementations of the present disclosure are described herein, the present disclosure is not limited to only these implementations, as discussed above. For example, the systems and methods disclosed herein may also be used in mining and demolition settings.

To control detonation of the explosive charge of the perforating gun, a remote control device can be implemented between a user controlling a control system and the perforating gun. The remote device is, in some examples, a switch as described above that enables the user to transmit a control signal from the control system to control when current is provided, via the switch, to the perforating gun to enable or facilitate detonation of the explosive charge or communication with the perforating gun by the remote control device and/or the control system. The switch is, in some examples, a bidirectional switch that facilitates transmitting uplink communication from the switch to the control system and receiving downlink communication at the switch from the control system. Multiple switches may be disposed along a wireline and be uniquely addressable and controllable via the uplink and downlink communication capabilities to facilitate unique control of multiple perforating guns.

The control system, in at least some examples, calibrates communication with the remote control device. For example, as a temperature of an environment surrounding the remote control device increases, a frequency at which the remote control device operates may change. In some examples, when the temperature of the environment surrounding the remote control device increases, frequency at which the remote control device operates decreases. In at least some implementations, the control system determines an amount of the decrease in frequency at which the remote control device is operating and modifies a frequency of communication of the control system with the remote control device to match the frequency at which the remote control device is operating. Similarly, in at least some examples, an amplitude of communication signals transmitted by the control system to the remote control device may decrease or decay as a length of the wireline between the control system and the remote control device increases. In at least some implementations, the control system determines the decrease in the amplitude of communication signals transmitted by the control system to the remote control device and modifies the amplitude of the communication signals transmitted by the control system to the remote control device to compensate for the decrease in amplitude.

In at least some examples, a voltage passed from the control system to the downstream tool, passing through the remote control device, can have a voltage of 1000 volts (V) or greater, such as 1500 V, 1700 V, etc. Accordingly, at least some examples of the remote control device are capable of blocking transmission of these voltages from the control system to the downstream tool. Some approaches to this blocking by the remote control device involve electromechanical switches. However, electromechanical switches can face mechanical failures that can render them inoperable when located remote to the control system, detrimentally affecting operation of the remote control device.

At least some aspects of the disclosure provide for a control system configured to communicate with a remote device coupled to the control system via a wireline. The control system is configured to superimpose a frequency-shift keying (FSK) encoded control signal on a power signal transmitted via the wireline. The control signal, in at least some examples, is uniquely addressed to the remote device such that the control system may communicate uniquely with multiple remote devices coupled to the wireline. In some examples, an operating frequency of the remote device varies from a frequency at which the control system is configured to transmit the control signal. In such examples, the control system may determine the operating frequency of the remote device and calibrate its transmission frequency to the operating frequency of the remote device. Similarly, in some examples the control signal may become attenuated from an amplitude at which it is transmitted by the control system and an amplitude at which it is received by the remote device. In such examples, the control system may determine an amount of the attenuation and compensate for the attenuation prior to transmitting the control signal. In other examples, the control system may provide a default or programmed amount of compensation to the control signal to compensate for the attenuation prior to transmitting the control signal. In some implementations, the control system can be configured to monitor the wirelines to receive communication from the remote device. The communication is, in some examples, conveyed via a Manchester encoded pattern.

Other aspects of the disclosure provide for a remote device, as described above. The remote device is, in some examples, a switch circuit as described above. The remote device can be configured to be located remotely to a controller, such as the control system described above. In at least some examples, the remote device operates as a blocking device on a wireline, selectively blocking or allowing passage of voltage and current from the control system located upstream to the remote device to a downstream device located downstream to the remote device. The remote device, in some examples, receives a control signal from the control system and determines data included in the control signal. The data is, in some examples, encoded into the control signal according to FSK. Based on the data of the control signal, the remote device may permit or deny a flow of power and/or the control signal (or another control signal) from the control system to the downstream device. In some examples, the remote device includes multiply-redundant safety measures for preventing unintentional passage of power from the control system to the downstream device. For example, the remote device may include redundant switches isolating the control system from the downstream device. Similarly, the remote device may include redundant data storage devices that independently store a status (e.g., on or off, closed or open, etc.) of the switches, where in the event of a mismatch between the statuses stored in the redundant data stores, the remote devices fails to a safe state in which the switches are controlled to be off. In some examples, the remote device provides upstream communication to the control system via a Manchester encoded pattern, encoded onto the wirelines coupling the remote device to the control system.

As a specific example in the oilfield context of the uses described above, a switch can be used in conjunction with each detonator or ignitor in a string of perforating guns to select and determine a sequence of firing. There are distinct types of switches such as a diode switch that allows two guns (or a gun and a plug) to be fired, one with positive and the other with negative voltage. Another type is a percussion switch that uses the force of detonation of one gun to electrically to connect electrically to the next gun starting from the bottom gun and working up. These switches are used to selectively fire three or more guns. These devices also electrically disconnect a fired gun thereby preventing electrical shorting. A problem with these switches is that in the event any switch fails to actuate, the firing sequence cannot continue, and the string must be pulled out from the well bore, redressed and run again. Another problem lies in the fact that the system on the surface depends on detecting the change in current to identify gun position in a changing environment which is not reliable.

Nowadays another type of communicable electronic switch is used, that has the ability of bidirectional communication and has no limitations to the number of guns that can be fired in a run. A common occurrence now seen is that as the spacing in the well is reduced a greater number of electronic switches are used at a much shorter spacing. This creates an issue with the communication head voltage due to the voltage drop across these devices. In addition to this having a substantial number of devices downhole means that each device has a greater probability of having its reference time base being affected by temperature.

The challenge in this environment is that the lateral portion of the well is far longer than before. Extended reach lateral wells require a long wireline and the longer the wireline the more lossy it is contributing to signal distortion. Also, the new E-coil units that run an electric cable or signal down coil tubing are very lossy methods of communication. The need for a novel communication system that addresses these challenges is described.

The systems and methods described herein can also apply to electronic blasting systems used in various industries such as mining, engineering, building removal systems, etc. In general, these systems are similar to wellbore perforating systems in the use of a communication system that can selectively control the detonation of one or more charges. For example, in the mining industry, the electronic detonators are used to fire the charges, and the electronic detonators can be programmable to achieve a desired firing sequence. The electronic detonators can be in communication with logging and control equipment over a communication link. In order to implement a desired blast design and initiate a blast according to that design, the various components of the system can communicate with each other over the communication links as required. The communication link can be wireless or wired, for example using wires, plugs, connectors, adaptors, and the like. When using wired communications, the environments in which the communication links are used can result in loss. For example, in mining applications, the communication link can pass through wet environments having varying temperatures and obstacles. The obstacles can result in damage to the wires and/or connectors, thereby presenting problems with communication link. This can result in the communication link suffering from loss and communication difficulties.

An object of the present description is to provide a system that accounts for and overcomes the challenges of communicating over lossy, long and distorted communication channels or links like wireline, E-slickline and E-coil tubing in hydrocarbon wells, and communication links in mining and engineering uses.

Also provided is a method for compensating the communication frequencies used to match the change in reference time base of a device (e.g., downhole device, mining device, etc.) due to temperature effects. As the number of devices or end units (e.g., downhole device, mining device or detonators, etc.) used increases, the amount by which the communication unit (e.g., surface communication unit, control unit, etc.) has to accommodate a deviation in the frequencies used also increases. The present communication system provides a solution to this by measuring the time base of the received responses from the end units and then adjusting the surface communication time base to match that of each end device. The term frequency scaled shift keying is introduced to distinguish it from other used digital modulation schemes such as frequency shift keying. In this scheme the mark and space frequencies are both shifted by the same percentage as the end unit time base has shifted.

Each communication channel acts like a filter attenuating different frequencies at various levels. Most end units (e.g., wireline, E-slickline, E-coil units, etc.) act as a low pass filter. The transition boundary between a mark and space frequency and vice versa is also affected due to the channel characteristics. To overcome this, a method of changing the amplitude of the waveform at the transition boundary is employed to reduce or nullify these effects. This technique of wave shaping along with the technique of frequency scaling applied at the transition boundary allows for a significant improvement in communication system reliability.

While the systems and method described herein are described in terms of a wellbore environment, the same systems and methods can apply to other uses and industries such as the mining and engineering industries. For example, communication with downhole units is equivalent to communication with end units in mining such as programmable detonators and/or sensors. In addition, the form factor for the end units and communication equipment may be different, but the same communication and operating principles described herein still apply.

Just as the downhole communication from the surface to the downhole device gets affected due to long cables so does the communication from the downhole to the surface get affected. To overcome that a wave shaping technique is used to vary the amplitude of the current Manchester at the transition boundaries. Waveform shaping using Manchester encoding provides for a robust uplink system that is not affected by the cable impedance or characteristics.

Also provided is a method for checking these devices in a tool string before lowering the tool string into a wellbore comprising the steps of sending a signal to one or more control units located on the devices in the tool string; identifying the status of each control unit; and processing the signal with the appropriate commands. The status or payload of one or more devices located in the tool string is controlled when the device processes a valid signal and a signal validating action is returned from the control unit.

Also provided is a communication system that allows both serial and parallel control of downhole devices including tractors, auxiliary tractor tools, well logging tools, release mechanisms, and sensors. The advantage of parallel control is that individual devices can be interrogated without going through a series path, thereby being more accessible. Each tool in the parallel arrangement has a control unit that carries a tool identifier (ID) as part of its uplink communication.

Another embodiment of the communication system allows for uplink communication from a downhole device while shooting power is applied from a surface control unit. When high voltage and current are applied from the surface it is quite challenging to receive small signals from the downhole unit. The use of the uplink communication wave shaping technique is utilized to overcome this shortcoming.

Also provided is a system for bi-directional communication with other devices such as selectively fired perforating guns, setting tool, pressure sensing tool, Gamma-Ray, Digital CCL, release devices, and downhole sensors. It features a system to select and fire specific guns in a perforating string. The downhole device may or may not have a unique addressing mechanism.

Referring now to FIG. 1, a diagram of an example system 100 is shown in accordance with aspects of the disclosure. The system 100 is representative of a hydrocarbon drilling implementation of the disclosure. However, as discussed above, the teachings of the disclosure are equally applicable to other implementations, such as mining, demolition, fireworks detonation, remote release mechanisms, etc. The system 100 includes a control system 102, a remote device 104, and a downstream device 106. The control system 102 is, in some examples, implemented on a vehicle, such as a vehicle that includes a wireline 108 on which the remote device 104 and the downstream device 106 are disposed. Although the system 100 illustrates only one remote device 104 and one downstream device 106, in various examples the system may include any number of remote devices 104 and/or downstream devices 106 disposed in any arrangement along the wirelines 108.

In at least some examples, the control system 102 is configured to provide power and/or a control signal to the downstream device 106. The remote device 104 is disposed on the wireline 108 in series between the control system 102 and the downstream device 106 and is configured to selectively block, or permit, the power and/or control signal provided by the control system 102 from reaching the downstream device 106. As discussed above, in at least some examples, an operating frequency of the remote device 104 varies from a frequency of data transmission of the control system 102. In such examples, the control system 102 may determine the operating frequency of the remote device 104 and match or synchronize a frequency of the control signal transmitted by the control system 102 to the remote device 104. For example, the control system 102 may receive a signal from the remote device 104 and measure a time base of the received signal. When the time base of the received signal varies from a time base of the control system 102, the control system 102 may modify its time base to match or synchronize with the time base determined from the received signal. For example, the control system 102 may perform term frequency scaled shift keying (FSSK) to shift mark and space frequencies of the FSK control signal based on the detected time base variance of the received signal.

Further, in at least some examples, communication channels, such as the wireline 108, can include characteristics that cause the communication channels to function in part as a filter, such as a low pass filter. This filtering behavior may attenuate the control signal transmitted by the control system 102 to the r Manchester emote device 104, degrading communication between the control system 102 and the remote device 104. For example, transition boundaries between marks and spaces of the FSK control signal may be altered by the filtering of the wireline 108. To compensate for and reduce the effect of this alteration, in some examples, the control system 102 modifies the amplitude of the control signal.

The remote device 104, in at least some examples, receives a power signal from the control system 102. The power signal, in some examples, includes the control signal, encoded according to FSK, superimposed on the power signal. In some examples, the power signal is an alternating current (AC) signal. In other examples, the power signal is a direct current (DC) signal of positive or negative polarity (e.g., such that the remote device 104 is power signal polarity agnostic). At least some implementations of the remote device 104 are configured to detect the control signal and convert the control signal to a square wave data signal. The control signal, and the resulting data signal, may include a plurality of binary data bits. Based on look-up tables or other programming of the remote device 104, the remote device 104 may control one or more switches to permit, or deny, power received by the remote device 104 from the control system 102 to pass to the downstream device 106 via the wireline 108. In some examples, the remote device 104 may further transmit control signals to, or receive signals from, the downstream device 106. In yet further examples, the remote device 104 may determine sensor feedback, such as voltage and/or temperature feedback. The remote device 104 may generate a response signal and transmit the response signal via the wireline 108 to the control system 102. For example, the remote device 104 may encode the response signal onto the wireline 108 via Manchester encoding, such as described in Institute of Electrical and Electronics Engineers (IEEE) standard 802.3, which is incorporated herein by reference. Manchester encoding, as described in IEEE 802.3, is a return to zero communication protocol in which a binary 1 is represented by a high to low transition in a signal and a binary 0 is represented by a low to high transition in the signal. Other forms of Manchester encoding may represent a binary 1 as a low to high transition in a signal and a binary 0 as a high to low transition in the signal.

In at least some examples, the system 100 also includes a test system 110. The test system 110, in some examples, is configured to test functionality of the remote device 104. The test system 110 operates substantially similar to the control system 102, but at lower voltages, and is discussed in greater detail below.

Figure 2:
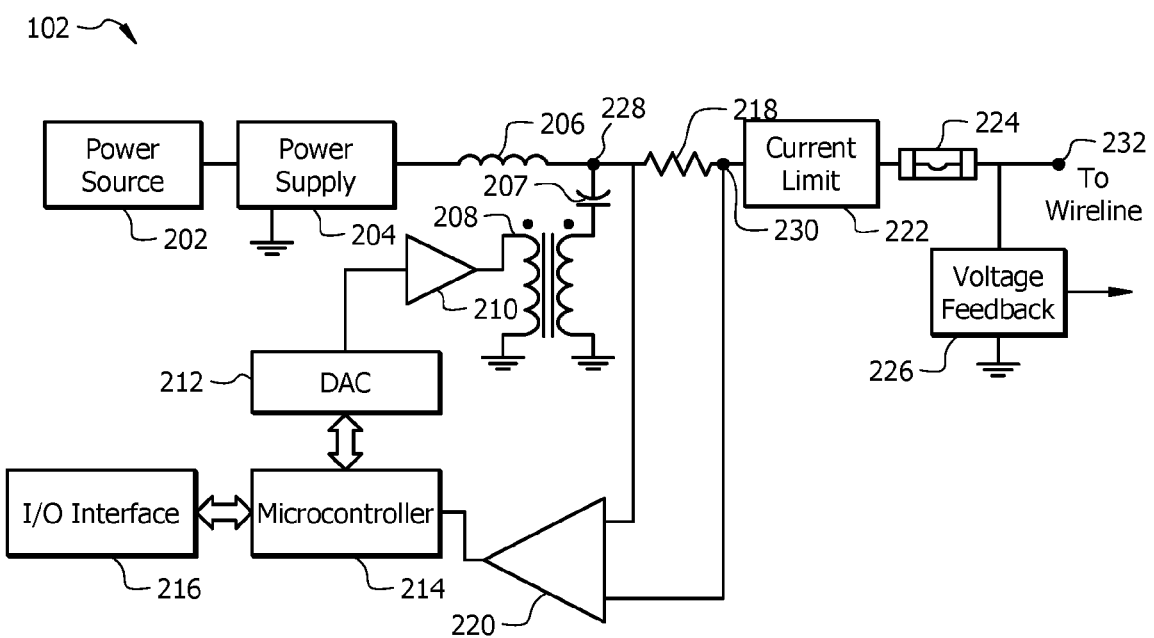
FIG. 2 is an example schematic diagram of the control system in accordance with various examples.

Referring now to FIG. 2, an example schematic diagram of the control system 102 is shown in accordance with aspects of the disclosure. In at least some examples, the control system 102 is referred to as a surface communication unit. The control system 102, in at least some examples, includes a power source 202, a power supply 204, an inductor 206, a capacitor 207, a transformer 208, an amplifier 210, a digital-to-analog converter (DAC) 212, a microcontroller 214, an input/output (I/O) interface 216, a resistor 218, a differential amplifier 220, a current limit circuit 222, a fuse 224, and a voltage feedback circuit 226. In at least some implementations of the control system 102, the current limit circuit includes a plurality of transistors, such as NPN transistors, that drop voltage across each of the transistors as current flowing through the transistors increases. The voltage feedback circuit 226, in some examples, includes a voltage divider followed by a buffer such that an output signal of the voltage feedback circuit 226 is a scaled representation of an input signal of the voltage feedback circuit 226. In an example architecture of the control system 102, the power source 202 is coupled to the power supply 204. The inductor 206 is coupled between the power supply 204 and a node 228. The capacitor 207 is coupled between the node 228 and a second winding of the transformer 208. The resistor 218 is coupled between the node 228 and a node 230. The current limit circuit 222 and the fuse 224 are coupled in series between the node 230 and a node 232. The voltage feedback circuit 226 is coupled to the node 232. The node 232 is, in some examples, an I/O node or terminal of the control system 102. In at least some examples, the control system 102 couples to the wirelines 108 at the node 232. The differential amplifier has a first input coupled to the node 228, a second input coupled to the node 230, and an output coupled to the microcontroller 214. The microcontroller 214 is further coupled to the I/O interface 216. Although only one I/O interface 216 is shown in FIG. 2, in various examples the microcontroller 214 may couple to any number of I/O interfaces 216, such as graphical user interfaces, user input devices, communication devices such as Universal Serial Bus communication interfaces, etc. The microcontroller 214 is further coupled to the DAC 212, which has an output coupled to an input of the amplifier 210. The amplifier 210 has an output coupled to a first winding of the transformer 208. Although not shown in FIG. 2, in at least some examples, an output of the voltage feedback circuit 226 is coupled to an input of the microcontroller 214. In other examples, the output of the voltage feedback circuit 226 is coupled to any suitable component for monitoring voltages in, or operation of, the control system 102.

In an example of operation of the control system 102, a power signal is provided by the power source 202 to the power supply 204. The power source 202, in at least some examples, provides power in a voltage range of about 12 V to about 18 V to the power supply 204. The power supply 204 is, in some examples, a power converter that increases or decreases a voltage of the power received from the power source 202. For example, in at least some implementations the power supply 204 is a boost power converter that boosts or increases the received voltage in the range of about 12 V to 18 V to a range of about 20 V to 70 V based on configuration of the power supply 204. In other examples, the power supply 204 may increase, or decrease, the voltage to any suitable value in any suitable range for a use case of the control system 102. In at least some examples, a voltage output by the power supply 204 may be determined at least in part according to voltage needs of a remote device or downstream device with which the control system 102 will communicate (e.g., such as the remote device 104 and/or the downstream device 106, each of FIG. 1) and/or a length of a wireline (and therefore voltage losses associated with the wirelines) over which the control system 102 will communicate with the remote device or downstream device.

The microcontroller 214, based at least in part on an input signal received via the I/O interface 216 and/or the differential amplifier 220, generates a data output signal and transmits that data output signal in a digital domain (e.g., as a series of discreet data bits) to the DAC 212, which converts that data output signal into an analog domain (e.g., as a sinusoidal, or sine, wave) and transmits the data output signal to the amplifier 210. The data output signal is, in some examples, a signal for interacting with a remote device such as the remote device 104 and/or the downstream device 106, each of FIG. 1. The data output signal may include an address of a device (or devices) to which the data output signal is addressed and one or more commands for the device(s). The amplifier 210 receives the data output signal and amplifies a value of the data output signal. In some examples, the amplifier 210 is a current amplifier that increases a value of the data output signal prior to providing the data output signal to a first winding of the transformer 208. The sine wave, in some examples, has a frequency and an amplitude that is programmable, such as by altering operating characteristics of the microcontroller 214, the DAC 212, and/or the amplifier 210.

The transformer 208 is configured as an impedance matching transformer to adapt to match an impedance at an output of the amplifier 210 to an impedance present at the node 228. A turns ratio of the first winding of the transformer 208 to the second winding of the transformer 208 is configured to match the impedance at the output of the amplifier 210 to the impedance present at the node 228 and determines a voltage of the data output signal as output by the second winding of the transformer 208. The capacitor 207 is a coupling capacitor that couples the data output signal output by the transformer 208, as an AC signal, to the node 228 while blocking any DC component of the data output signal. The data output signal as provided at the node 228 is, in some examples, referred to herein as a control signal and is imposed on a power signal, as described above with respect to FIG. 1. The inductor 206, in at least some examples, prevents or blocks the control signal, based on the AC nature of the control signal, from flowing to the power supply 204 and potentially damaging or altering operation of the power supply 204.

The control signal is superimposed on the voltage output by the power supply 204 and flows through the resistor 218. A voltage drop occurs between the node 228 and the node 230 due to an impedance of the resistor 218. Accordingly, in at least some implementations, the resistor 218 is referred to as a current viewing resistor. The difference in voltages present at the node 228 and the node 230 is sensed by the differential amplifier 220 and provided to the microcontroller 214 as feedback. The microcontroller 214 may use the feedback for any suitable purpose, such as determining whether the control system 102, or any of its components are operating properly.

The current limit circuit 222 is configured to monitor a current flowing from the node 230 to the node 232 to determine whether a value of the current exceeds a safe level for one or more other devices coupled to the control system 102, such as the remote device 104 and/or the downstream device 106, each of FIG. 1. The fuse 224 is similarly configured to respond to a current flowing through the fuse 224 exceeding a rated value for the fuse 224 by creating an open circuit, or electrical disconnection, in the control system 102 in place of the fuse 224. The voltage feedback circuit 226, in at least some examples, monitors the node 232 to provide feedback indicating a voltage that is present at the node 232. The feedback, in some examples, indicates whether the control system 102 is operating properly.

As discussed above, in at least some examples, the control signal is encoded according to FSK. For example, a first portion of the control signal that represents a value of digital logic "1" or high value has a first frequency and a second portion of the control signal that represents a value of digital logic "0" or low value has a second frequency. In at least one implementation of the control system 102, the first frequency is about 5500 Hertz (Hz) and the second frequency is about 3000 Hz. In such an example, the control signal has a baud rate of about 500 bits/second, or a bit time of about 2.0 milliseconds. In at least some examples, a device receiving the control signal is configured to communicate and/or operate at a substantially same frequency as the control system 102 and the control signal. However, as discussed above, in some circumstances the control system 102 may be in communication with a device, such as the remote device 104 of FIG. 1, that may be operating at a different frequency as a result of environmental conditions (such as temperature) surrounding the device. In such an example, an oscillator crystal of the device may slow, resulting in a decrease in operating frequency of the device. This decrease in operating frequency may introduce errors into communication between the control system 102 and the device, such that the device misinterprets the control signal.

To compensate for this variation in frequency, the control system 102 may measures a time base of a signal received from the device. For example, the control system 102 may determine the time base of the signal received from the device based on feedback provided to the microcontroller 214 by the differential amplifier 220 based on changes in voltage detected across the resistor 218. The microcontroller 214 may compare the detected time base to an expected or programmed time base and determine whether a variation exists between the detected time base and the expected or programmed time base. When a variation exists, the microcontroller 214 may modify generation of the data output signal to cause the control signal as provided at the node 228 to be at a frequency synchronized (e.g., approximately the same as) the operating frequency of the device. In at least some examples, the microcontroller 214 modifies generation of the data output signal, or generates the data output signal, according to FSSK.

Further as discussed above, in at least some examples losses can occur in the control signal during transmission over a wireline of certain length. For example, a wireline of certain length may function effectively as a low pass filter from a perspective of the control signal. When the control signal is at low frequency, such as about 3000 Hz, as discussed above, the control signal may have a greater amount of energy than when the control signal is a high frequency, such as about 5500 Hz, also as discussed above. At a transition boundary, such as when the control signal changes from about 3000 Hz to about 5500 Hz to indicate a change in value from a digital logic low to a digital logic high, an amplitude of the 5500 Hz control signal following the transition boundary may be attenuated. This attenuation can distort the control signal and adversely affect receipt, interpretation, and/or processing of the control signal by a device receiving the control signal. To compensate for, or mitigate, the attenuation, the control system 102 can provide a pre-emphasis on the control signal following a transition boundary from about 3000 Hz to about 5500 Hz. In various examples, the pre-emphasis is applied for any number of cycles of the control signal following the transition boundary. For example, as a capacitance of the wirelines increases (such as in a multi-conductor cable), the attenuation described above may also increase. Therefore, as capacitance of the wireline increases, so too may the number of cycles of the control signal following the transition boundary for which pre-emphasis is applied. In at least one implementation, the pre-emphasis is applied for two cycles following the transition boundary.

Figure 3:
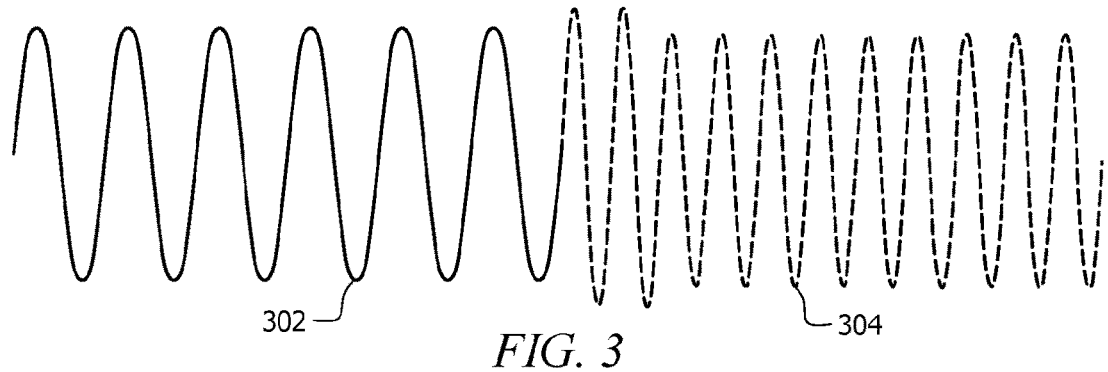
FIG. 3 is a diagram of an example of a control signal having pre-emphasis in accordance with various examples.

The pre-emphasis increases an amplitude of the control signal following the transition boundary from about 3000 Hz to about 5500 Hz for a period of time that the control system 102 applies the pre-emphasis, thus compensating for, or negating, loses associated with the wireline over which the control system 102 transmits the control signal. For example, the microcontroller 214 may increase a value of the digital output signal provided to the DAC 212 for an amount of time, a number of cycles, or any other suitable timeframe for which the control signal will include the pre-emphasis. In at least some examples, the microcontroller 214 also modifies generation and output of the digital output signal to perform wave shaping that varies a wave shape of the control signal from that of a pure sinewave. An example of a control signal having pre-emphasis as described herein is shown in FIG. 3 in which signal component 302 is a component of the control signal having the frequency of about 3000 Hz and signal component 304 is a component of the control signal having the frequency of about 5500 Hz. As illustrated in FIG. 3, the signal component 304 includes pre-emphasis for between about 1 to about 5 cycles, or about 2 cycles or periods of the control signal. However, in other examples, the signal component 304 may include the pre-emphasis for any number of cycles or periods of the control signal as determined by the control system 102 or programmed by a user.

Returning to FIG. 2, in at least some examples, the control system 102 is modified to create the test system 110. In at least some examples, the test system 110 is referred to as a surface check system. In implementations of the control system 102 modified to form the test system 110, the power source 202 may be implemented as a battery, for example, to facilitate portability and to provide a limited amount of power, such as may be insufficient to detonate an explosive device with which the test system 110 communicates. The power supply 204 may be programmed to provide no more than a preset amount of current, such as, in some examples, about 15 milliamps. The current limit circuit 222 may be implemented as a pair of redundant, series-connected current limit and trip circuits. The current limit and trip circuits, in at least some examples, an integrated circuit or other component that measures a voltage drop, such as across a resistor, and generates an output signal that controls a switch. The output signal may become asserted when the integrated circuit determines based on the measured voltage drop that a current flowing through the current limit and trip circuit has exceeded a programmed value. The switch, when activated based on the asserted output signal, changes states to prevent the excessive current from flowing out from the test system 110. In this way, the test system 110 may be safely used to test live explosives, or other potentially dangerous devices, in a safe manner resulting at least partially from the current limit and trip circuits preventing current sufficient to trigger the dangerous devices from detonating or otherwise disadvantageously activating. In at least some examples, the test system 110 includes multiple redundant safety measures such that it has no single failure point that, if failed, would allow an uncontrolled amount of current to pass out from the test system 110.

Figure 4:
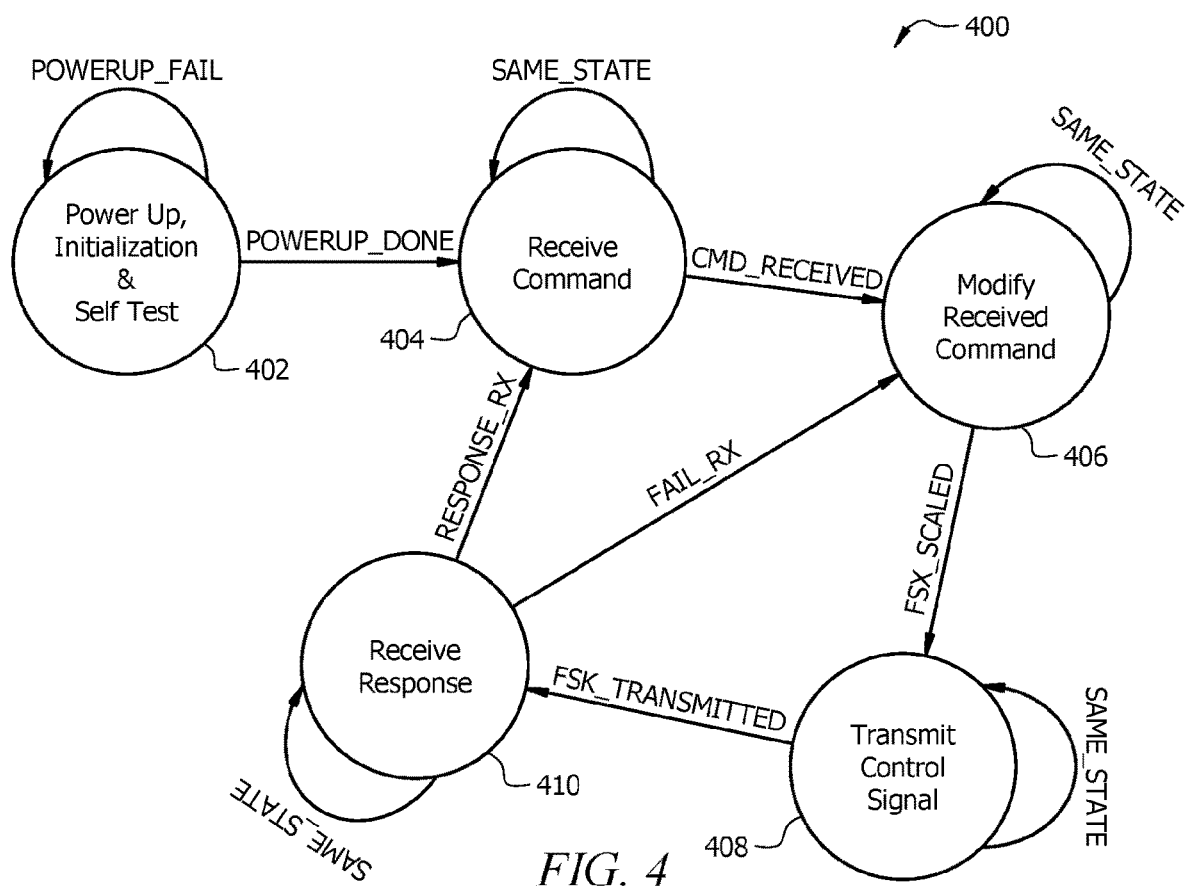
FIG. 4 is a state diagram of a state machine in accordance with various examples.

Referring now to FIG. 4, a diagram of an example state machine 400 is shown in accordance with aspects of the disclosure. In at least some examples, the state machine 400 is implemented by the control system 102, such as by the microcontroller 214, as discussed elsewhere herein. The state machine 400 is implemented to, in some examples, synchronize a frequency of a control signal provided by the control system 102 to an operating frequency of the a device receiving the control signal, and communicate with the device to provide data to the device and receive data from the device.

At state 402, the control system 102 is powered-on and initialized. In at least some examples, the state machine 400 controls the control system 102 to perform a self-test to verify functionality of the control system 102. When an aspect of state 402 fails (POWERUP_FAIL), such as a failure to power-on, an initialization failure, or a self-test failure, in at least some examples, the state machine 400 remains at, and repeats at least a portion of functions of, the state 402. When the functions of the state 402 are successfully executed (POWERUP_DONE), the state machine 400 proceeds to state 404.

At state 404, the state machine 400 receives a command for execution by the control system 102, such as via the state machine 400. The command is received, in some examples, from a user via an I/O interface, such as the I/O interface 216 discussed above. The command may be a command to synchronize the control system 102 to an operating frequency, or communication time base, of a remote device with which the control system 102 is communicatively coupled (e.g., such as the remote device 104 and/or the downstream device 106, as discussed above with respect to FIG. 1). In other examples, the command may be for a remote device to control a switch to open to facilitate a flow of power, or close to inhibit a flow of power, along a wireline. In yet other examples, the command may be any suitable command for an application environment of the control system 102. When no command is received at state 404 (SAME_STATE), the state machine 400 remains at state 404 and awaits a command. When a valid command is received at state 404 (CMD RECEIVED), the state machine 400 proceeds to state 406.

At state 406, the state machine 400 modifies the command received at the state 404 to generate a control signal. The control signal is, in some examples, an FSK encoded signal generated based on the command received at the state 404. In some examples, to generate the control signal the state machine 400 applies a scaling factor to a FSK encoded signal generated by the microcontroller 214 according to the command received at the state 404. The scaling factor, in at least some examples, compensates for variation in communication frequency of the control system 102 and operating frequency of the remote device with which the control system 102 is communicatively coupled. In some examples, the state machine 400 obtains the scaling factor from a storage location, such as a memory coupled to the microcontroller or a memory of the microcontroller 214. The storage location is, in some examples, a volatile memory such that data stored in the storage location is lost when the control system 102 is power cycled. In other examples, the storage location is a non-volatile storage location such that data stored in the storage location is not lost when the control system 102 is power cycled and instead persists until removed or overwritten.

When the scaling factor is not stored in the storage location, the state machine 400 transmits a FSSK command to the remote device with which the control system 102 is communicatively coupled. The FSSK command, in at least some examples, is a calibration command instructs the remote device to return a response to the control system 102 for the control system 102 to use for communication frequency or other calibration. The control system 102 determines a time base, or frequency, of the response and compares that to either an expected value, a programmed value, or a default value of the control system 102. When the time base, or frequency, of the response does not match the expected, programmed, or default value, the state machine 400 determines the scaling factor and stores the scaling factor in the storage location. For example, when the state machine 400 determines that the time base, or frequency, of the response varies from the expected, programmed, or default value by −5%, the state machine 400 may store a scaling factor of 0.95. Similarly, when the state machine 400 determines that the time base, or frequency, of the response varies from the expected, programmed, or default value by +5%, the state machine 400 may store a scaling factor of 1.05.

In at least some examples, at state 406 the state machine 400 further modifies an amplitude of the control signal. For example, the state machine 400 may apply pre-emphasis to the control signal, increasing an amplitude of the control signal for a programmed number of periods of the control signal to compensate for transmission losses associated with a communication channel through which the control system 102 and the remote device are coupled. The processing of the control signal performed at state 406, in at least some examples, conditions the control signal for transmission via the communication channel through which the control system 102 and the remote device are coupled. Conditioning the control signal, in at least some examples, provides compensation in the control signal for effects of transmitting the control signal, such as via the communication channel and/or to the remote device. When the control signal is not yet generated, scaled, and shaped (e.g., based on the application of pre-emphasis), the state machine 400 remains (SAME_STATE) at the state 406. When the control signal is generated and scaled and/or shaped as determined by the state machine 400 to be advantageous, the (FSK SCALED), the state machine 400 proceeds to state 408.

At state 408, the control signal is transmitted to the remote device via the communication channel through which the control system 102 and the remote device are coupled. In at least some examples, the communication channel is a wireline. The control signal is transmitted, in some examples, by the control system 102 superimposing the control signal over an AC or DC power signal being provided to the remote device via the communication channel. When the control signal is not yet transmitted, the state machine 400 remains (SAME_STATE) at the state 408. When the control signal has been transmitted (FSK TRANSMITTED), the state machine proceeds to state 410.

At state 410, the state machine receives a response from the remote device via the communication channel through which the control system 102 and the remote device are coupled. In at least some examples, the response is a Manchester encoded response, as described elsewhere herein. Based on the response, the state machine 400 may generate and output feedback for a user, such as to inform the user about a condition, state, or status of, or reported by, the remote device. When the state machine 400 has not yet received the response from the remote device, the state machine 400 remains (SAME_STATE) at the state 410. When the state machine 400 has received a response from the remote device, but the response has failed for some reason, the state machine 400 proceeds (FAIL RX) to the state 406. In at least some examples, when the state machine 400 proceeds from the state 410 to the state 406, the state machine 400 discards a scaling factor stored by the control system 102 and re-determines the scaling factor, as described above with respect to the state 406. When the state machine 400 has successfully received and processed the response from the remote device, the state machine 400 proceeds (RESPONSE RX) to the state 404 and awaits a next command.

Figure 5:
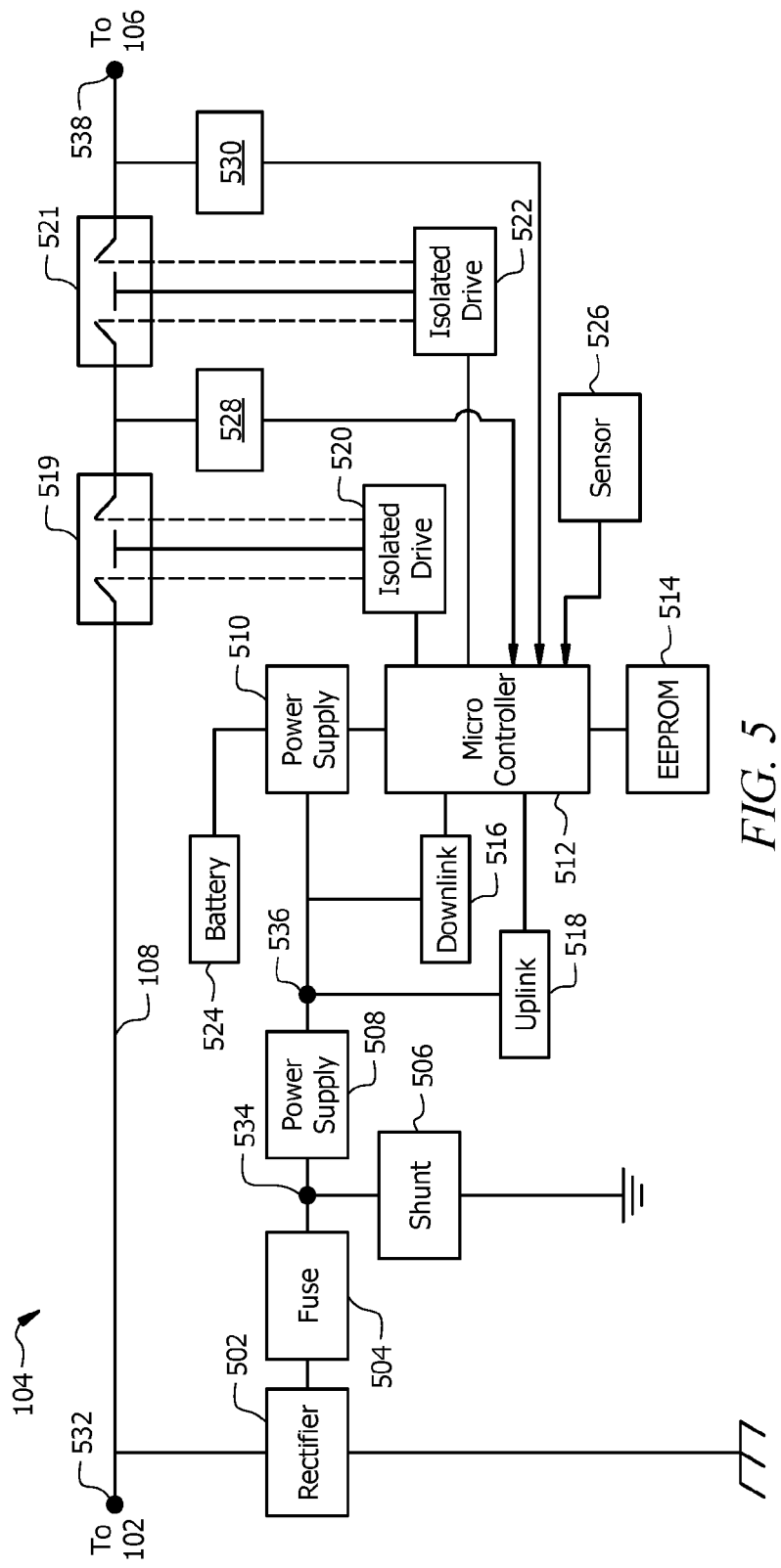
FIG. 5 is a block diagram of an example remote device in accordance with various examples.

Referring now to FIG. 5, a block diagram of an example remote device 104 is shown in accordance with aspects of the disclosure. In at least some examples, the remote device 104 is referred to as a safety sub or a universal safety sub. The remote device 104, in at least some examples, includes a rectifier 502, a fuse 504, a shunt 506, a power supply 508, a power supply 510, a microcontroller 512, an electrically erasable programmable read-only memory (EEPROM) 514, a downlink circuit 516, an uplink circuit 518, a switch circuit 519, an isolated drive circuit 520, a switch circuit 521, and an isolated drive circuit 522. In at least some examples, the remote device 104 also includes one or more of a battery 524, a sensor circuit 526, a self-test circuit 528, and/or a self-test circuit 530.

In an example architecture of the remote device 104, the rectifier 502 is coupled between a terminal 532, configured to couple to a conductor of the wireline 108, and an armor, or sheathing, of the wireline 108 that functions as a chassis ground for the remote device 104. The rectifier 502 has an output coupled through the fuse 504 to a node 534. The shunt 506 is coupled between the node 534 and an earth ground. The power supply 508 has an input coupled to the node 534 and an output coupled to a node 536. The power supply 510 has an input coupled to the node 536 and an output coupled to an input of the microcontroller 512. In example of the remote device 104 that include the battery 524, the power supply 510 may have a second input coupled to an output of the battery 524. The EEPROM 514 is coupled bidirectionally to the microcontroller 512. The downlink circuit 516 is coupled between the node 536 and another input of the microcontroller 512. The uplink circuit 518 is coupled between an output of the microcontroller 512 and the node 536. The switch circuit 519 and the switch circuit 521 are coupled in series between the terminal 532 and a terminal 538. The isolated drive circuit 520 is coupled between another output of the microcontroller 512 and a control input of the switch circuit 519. The isolated drive circuit 522 is coupled between another output of the microcontroller 512 and a control input of the switch circuit 521. In examples of the remote device 104 that include the sensor circuit 526, an output of the sensor circuit may be coupled to another input of the microcontroller 512. In examples of the remote device 104 that include the self-test circuit 528, the self-test circuit 528 is coupled between a node between the switch circuit 519 and the switch circuit 521 and another input of the microcontroller 512. In examples of the remote device 104 that include the self-test circuit 530, the self-test circuit 530 is coupled between the terminal 538 and another input of the microcontroller 512.

In an example of operation of the remote device 104, a signal is received at the terminal 532. The signal is, in some examples, a power signal having a control signal superimposed on the power signal. In at least some examples, the signal received at the terminal 532 may have a voltage of up to about 1800 V or greater. Such a voltage may be received, for example, from a firing power supply or other device, component, or circuit configured to provide a high-voltage on the wireline. By default, the switch circuit 519 and the switch circuit 521 are each configured to be open (e.g., normally open switches) to block the signal received at the terminal 532 from being passed to the terminal 538 without the microcontroller 512 permitting such signal passage. Thus, when the remote device 104 is not receiving power at the terminal 532, the switch circuit 519 and the switch circuit 521 are each in an open state. The power signal is, in some examples, an AC signal. In other examples, the power signal is a DC signal.

The rectifier 502 receives the signal and rectifies the signal. The rectifier 502 may be of any suitable architecture, the scope of which is not limited herein. For example, the rectifier 502 may be any of a half-wave, full-wave, or bridge rectifier. Generally, the rectifier 502 provides a rectified signal to the fuse 504 regardless of a polarity of the signal received at the terminal 532. The fuse 504 is configured to prevent current exceeding a rating of the fuse 504 from damaging components of the remote device 104, such as the microcontroller 512. For example, the fuse 504 is configured to respond to a current flowing through the fuse 504 exceeding a rated value for the fuse 504 by creating an open circuit, or electrical disconnection, in the remote device in place of the fuse 504. The shunt 506 is configured to provide a low impedance path to the earth ground from the node 534 to further protect components of the remote device 104, such as the microcontroller 512, from damage resulting from high current or high voltage being present at the node 534. For example, the shunt 506 includes spark gaps that cause the fuse 504 to short in the event of an over voltage event and radio frequency (RF) circuitry to shunt RF waves that may be present at the terminal 532, preventing those RF waves from passing through the remote device 104 to the terminal 538.

The power supply 508 is, in some examples, configured to reduce a voltage of a signal received by the power supply 508 to about 12 V. In other examples, the power supply 508 may be configured to provide an output voltage of any suitable or programmed value. The power supply 508 is, in various examples, capable of withstanding input voltages of up to about 1800 V and operating with input voltages as low as about 18 V. The power supply 508 may have a linear architecture, a switching architecture, or any other suitable architecture, the scope of which is not limited herein. The power supply 510 is, in some examples, configured to generate a voltage for use by the microcontroller 512. In some examples, as will be used for discussion herein, that voltage is about 5 V. However, in other examples that voltage may be about 3.3 V, about 3 V, about 1.8 V, etc. In at least some examples, the power supply 510 is a linear power supply. In other examples, the power supply 510 has any suitable architecture, the scope of which is not limited herein.

When the microcontroller 512 receives power from the power supply 510, the microcontroller 512 powers on and queries the EEPROM 514 to determine a switch state for each of the switch circuit 519 and the switch circuit 521. The switch state, in at least some examples, indicates whether the microcontroller 512 was most recently controlling the switch circuit 519 and the switch circuit 521 to be open or closed. The microcontroller 512 also queries an internal memory (not shown) of the microcontroller 512 for the switch state. When the internally stored switch state of the microcontroller 512 and the switch state as stored by the EEPROM 514 match, the microcontroller 512 provides control signals to the isolated drive circuit 520 and the isolated drive circuit 522 to return the switch circuit 519 and the switch circuit 521, respectively, to their prior switch state. After providing the control signals, the microcontroller 512 may wait to receive a command from the downlink circuit 516, as will be further discussed below. When the internally stored switch state of the microcontroller 512 and the switch state as stored by the EEPROM 514 do not match, the microcontroller 512 provides control signals to the isolated drive circuit 520 and the isolated drive circuit 522 to maintain the switch circuit 519 and the switch circuit 521, respectively, in an open state. Further, when the internally stored switch state of the microcontroller 512 and the switch state as stored by the EEPROM 514 do not match, the microcontroller may transmit a response message to a control system, such as the control system 102 via the wirelines 108, each of FIG. 1, through the uplink circuit 518, as will be further discussed below, informing the control system of the mismatched switch states and/or actions taken by the microcontroller 512.

Based on the control signals received from the microcontroller 512, the isolated drive circuit 520 and the isolated drive circuit 522 control the switch circuit 519 and the switch circuit 521, respectively. In at least some examples, the switch circuit 519 and the switch circuit 521 each include field-effect transistors, such as n-channel silicon-carbide metal oxide semiconductor field-effect (NMOS) transistors implemented as switches. In other examples, the field-effect transistors are of silicon, silicon-on-insulator, gallium-nitride, or any other suitable construction, process, chemistry, or process technology. Each of the switch circuit 519 and the switch circuit 521 may include a pair of back to back coupled NMOS transistors, controlled from a common control source such as the isolated drive circuit 520 and the isolated drive circuit 522, respectively, to facilitate bi-directional flow of current thought the switch circuit 519 and the switch circuit 521. To cause current to flow through an NMOS transistor, a value of a signal present at a gate terminal of the NMOS transistor must exceed a voltage present at a source terminal of the NMOS transistor by a threshold amount. Thus, to turn on the switch circuit 519 and the switch circuit 521, in some examples, the isolated drive circuit 520 and the isolated drive circuit 522 are required to provide a voltage at the gate terminals of the NMOS transistors of the switch circuit 519 and the switch circuit 521, respectively, that is greater in value than a signal that is, or will be, present at the source terminals of the NMOS transistors of the switch circuit 519 and the switch circuit 521. However, as discussed above, the wireline may carry high voltages of up to about 1800 V, or more. Therefore, in some circumstances, the isolated drive circuit 520 and the isolated drive circuit 522 may be required to provide a voltage greater than 1800 V at the gate terminals of the NMOS transistors of the switch circuit 519 and the switch circuit 521, respectively, to turn on the NMOS transistors and therefore turn on the switch circuit 519 and the switch circuit 521. Because the microcontroller operates at a voltage of 5 V, and therefore drives the isolated drive circuit 520 and the isolated drive circuit 522 with a control signal having a value of no more than approximately 5 V, challenges can sometimes arise in the isolated drive circuit 520 and the isolated drive circuit 522 controlling the switch circuit 519 and the switch circuit 521, respectively, to turn on.

Figure 6:
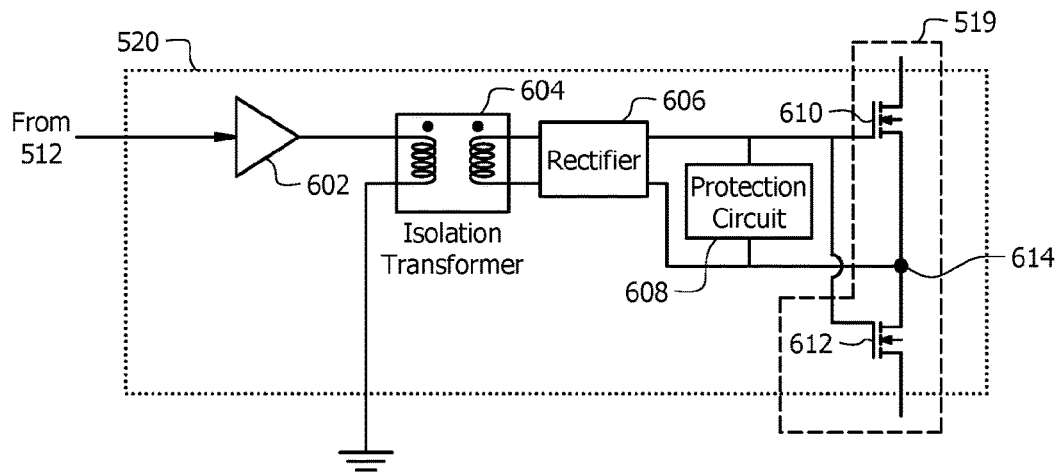
FIG. 6 is a block diagram of an example isolated drive circuit in accordance with various examples.

Referring now to FIG. 6, a block diagram of an example isolated drive circuit is shown in accordance with aspects of the disclosure. In at least some examples, the isolated drive circuit is suitable for implementation as the isolated drive circuit 520 and/or the isolated drive circuit 522, each of FIG. 5. Accordingly, for description the isolated drive circuit of FIG. 6 will be described with reference to the isolated drive circuit 520. However, the isolated drive circuit 520 may be substantially similar in architecture and operation to the isolated drive circuit 522. In at least one example, the isolated drive circuit 520 includes a driver 602, a transformer 604, a rectifier 606, and a protection circuit 608. As discussed above, isolated drive circuit 520 is configured to couple between the microcontroller 512 and the switch circuit 519 to control the switch circuit 519 based on a control signal received from the microcontroller 512. The switch circuit 519, in at least some examples, includes a NMOS transistor 610 and a NMOS transistor 612.

In an example of the isolated drive circuit 520, the driver 602 has an input configured to receive a control signal from the microcontroller 512 and an output coupled to a first winding of the transformer 604. A second winding of the transformer 604 is coupled to the rectifier 606. In at least some examples, the transformer 604 is an isolation transformer having a winding ratio of 1:1.2 such that an output voltage of the transformer is approximately equal to an input voltage of the transformer. The rectifier 606 is configured to rectify a voltage provided by the second winding of the transformer 604 with reference to a voltage present at a node 614. For example, when the voltage present at the node 614 is X and an output voltage of the transformer 604 is Y, the rectifier 606 outputs a voltage approximately equal to X+Y volts, minus any losses associated with a critical path of the rectifier 606 (such as diode loss(es), etc.). Each of the NMOS transistor 610 and the NMOS transistor 612 have their source terminals coupled to the node 614. Therefore, when a rectified signal provided at an output terminal of the rectifier 606, which is coupled to gate terminals of the NMOS transistor 610 and the NMOS transistor 612, is approximately Y volts greater than a voltage present at the source terminal of the NMOS transistor 610 and the NMOS transistor 612. When Y volts is greater than a gate-to-source voltage threshold of the NMOS transistor 610 and the NMOS transistor 612, the NMOS transistor 610 and the NMOS transistor 612 turn on and conduct current. Therefore, the arrangement of the rectifier 606, in at least some examples, mitigates at least some challenges associated with controlling the switch circuit 519 based on a 5 V control signal output by the microcontroller 512, as discussed above with respect to FIG. 5.

In at least some examples, the protection circuit 608 is coupled between the output terminal of the rectifier 606 and the node 614. The protection circuit 608, in at least some examples, is any circuit or component suitable for protecting the NMOS transistor 610 and the NMOS transistor 612 from damage resulting from overvoltage or overcurrent signals being provided to their respective gate terminals.

In some examples, the driver 602 is instead implemented as an open drain transistor configured to drive the transformer 604. In other examples, the driver 602 is omitted and the transformer 604 is driver directly by the microcontroller 512. In some examples, the transformer 604 may be an iron core or air core transformer operating in forward mode or fly back mode. In other examples, the transformer may be implemented via metal traces on a di-electric substrate with the di-electric substrate as coupling for the transformer. In yet other examples, a voltage multiplier, charge pump, inductive coupler, or other suitable component may be used in place of, or in conjunction with, the transformer 604.

Returning again to FIG. 5, the downlink circuit 516 monitors the node 536 to receive the control signal and provide data included in the control signal to the microcontroller. For example, the downlink circuit 516 may detect the FSK or FSSK encoded pattern of the control signal and convert the FSK or FSSK encoded pattern to a series of binary data bits. The downlink circuit 516 may provide the binary data bits to the microcontroller 512 and the microcontroller 512 may interpret the binary data bits as a command to be executed, based on a programmed routine, function, application, firmware, or other executable code of the microcontroller 512. The downlink circuit 516 may detect the FSK or FSSK encoded pattern of the control signal and convert the FSK or FSSK encoded pattern to a series of binary data bits according to any suitable process and via any suitable hardware architecture, the scope of which is not limited herein.

Similarly, the microcontroller 512 may output a plurality of binary data bits to the uplink circuit 518. Based on the binary data bits, the uplink circuit 518 may modify a load placed on the node 536, which is reflected in a value of a load present at the terminal 532 and is visible by a control system, such as the control system 102 of FIG. 1, by viewing a change in voltage across a resistor, such as the resistor 218 of FIG. 2. The uplink circuit 518 may modify the load placed on the node 536, in at least some examples, according to Manchester encoding such that the control system may detect and view a Manchester encoded pattern on a wireline coupled to the terminal 532. In other examples, the uplink circuit 518 may modify the load placed on the node 536, in at least some examples, according to any suitable encoding scheme. In various examples, the uplink circuit 518 may have any hardware architecture suitable for implementing an encoding scheme implemented by the uplink circuit 518. The uplink circuit 518 modifying the load by modulating a current present on the wireline by an amount in a range of about 25 milliamps to about 100 milliamps.

Figure 7:
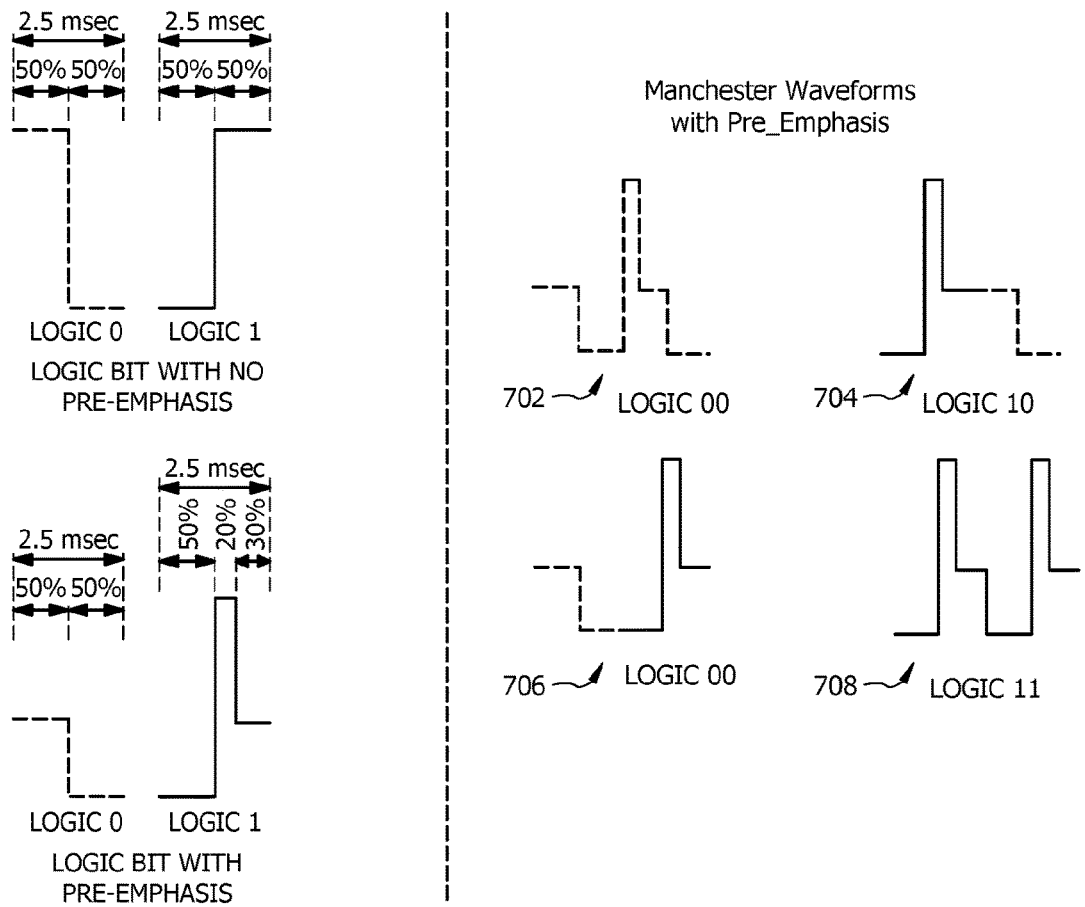
FIG. 7 is a diagram of an example of a Manchester encoded waveform having pre-emphasis in accordance with various examples.

As discussed above with respect to the control system 102, loses may occur in transmission between a control system and a remote device, such as the remote device 104. To compensate for, or mitigate, these loses, the uplink circuit 518 may have multiple operation modes. For example, the uplink circuit 518 may include a normal operation mode and a pre-emphasis operation mode. Other examples of the uplink circuit 518 may omit the pre-emphasis operation mode. The pre-emphasis operation mode may increase a load placed on the node 536 when compared to a load placed on the node 536 during the normal operation mode. The pre-emphasis compensates for loses in a manner similar to the pre-emphasis described above with respect to the control system 102. An example of Manchester encoded waveforms having pre-emphasis as described herein are shown in FIG. 7. As shown in FIG. 7, the waveform 702 is representative of a logic signal having a 00, the waveform 704 is representative of a logic signal 10, the waveform 706 is representative of a logic signal 01, and the waveform 708 is representative of a logic signal 11. As further shown in FIG. 7, the pre-emphasis applied to the Manchester encoding, in at least some examples, is applied for about 10% of an asserted time for a data bit following a boundary transition.

Returning again to FIG. 5, as discussed above, some examples of the remote device 104 include a battery 524. In such examples, the battery 524 provides power to the power supply 510 in the absence of a power signal being received at the terminal 532. The power supply 510 in turn provides power to the microcontroller 512 enabling a clock of the microcontroller 512 to remain operational. When the timer reaches a predetermined value, such as a predetermined amount of time since a last timer reset, which may occur each time a valid command is received by the remote device 104 (or at any other suitable time), the microcontroller 512 may enter a battery timer state. When the microcontroller 512 enters the battery timer state, the microcontroller 512 may shutdown the remote device 104, controlling the isolated drive circuit 520 and the isolated drive circuit 522 to control the switch circuit 519 and the switch circuit 521, respectively, to open and saving a switch state of open for each of the switch circuit 519 and the switch circuit 521 to the internal memory of the microcontroller 512 and the EEPROM 514.

Also as discussed above, some examples of the remote device 104 include a sensor circuit 526. The sensor circuit 526 may include, or be coupled to, any suitable sensors such as temperature sensors and/or voltage sensors. The microcontroller 512 may received data from the sensor circuit 526 and act on the received data, either by transmitting the received data to a control system via the uplink circuit 518, as discussed above, or by controlling the switch circuit 519 and the switch circuit 521 at least partially based on the received data. Also as discussed above, some examples of the remote device 104 include a self-test circuit 528, and/or a self-test circuit 530. In at least some examples, the self-test circuit 528, and the self-test circuit 530 are each of any suitable architecture for detecting a voltage having a value up to about 1800 V and reporting a result of that detection to the microcontroller in a voltage range between 0 V and about 5 V.

Figure 8:
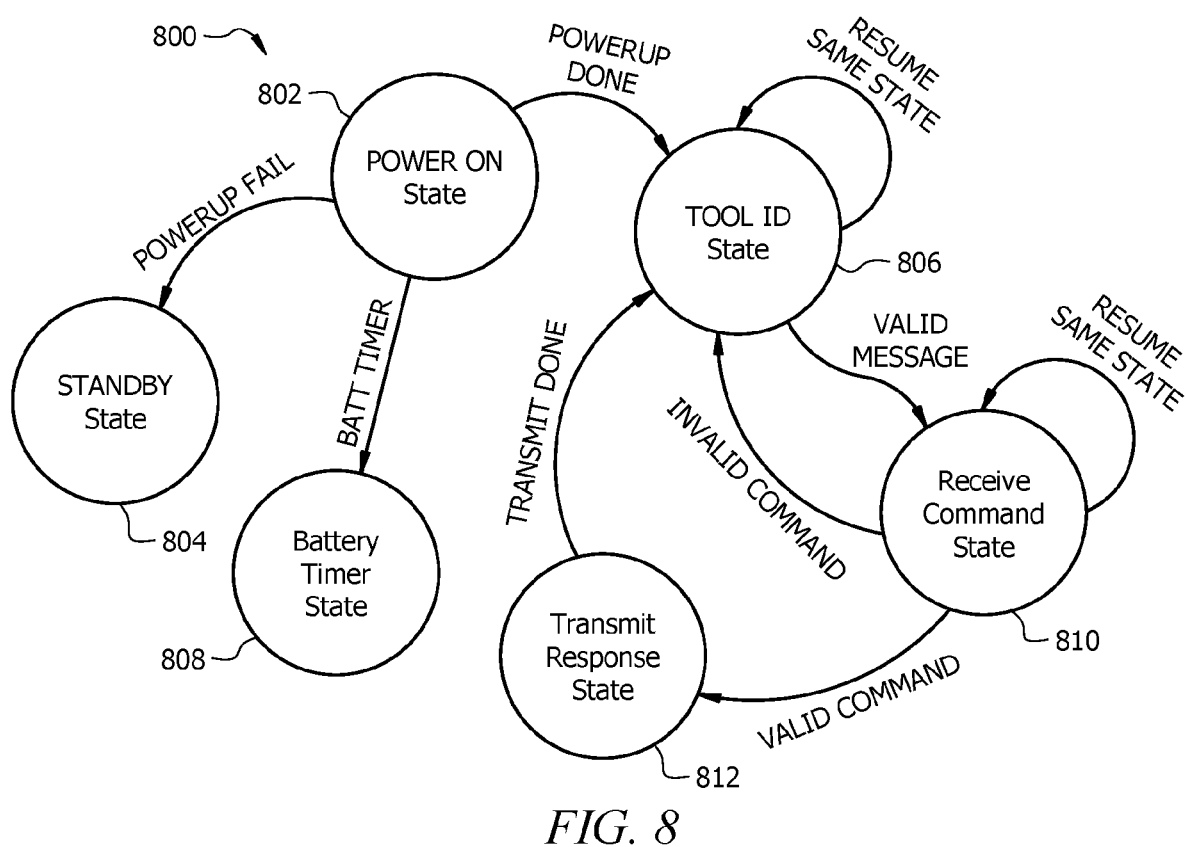
FIG. 8 is a state diagram of a state machine in accordance with various examples.

Referring now to FIG. 8, a diagram of an example state machine 800 is shown in accordance with aspects of the disclosure. In at least some examples, the state machine 800 is implemented by the remote device 104, such as by the microcontroller 512, as discussed elsewhere herein. The state machine 800 is implemented to, in some examples, to receive commands from a control system for controlling one or more switch circuits, control the switch circuits, and transmit response messages to the control system.

At state 802, when power is applied to the microcontroller 512, the state machine 800 reads switch states from the EEPROM 514 and the internal memory of the microcontroller 512. When the switch states read from the EEPROM 514 and the internal memory of the microcontroller 512 do not match or are otherwise unavailable or invalid, the state machine 800 proceeds (POWERUP_FAIL) to state 804 and remains at state 804 until being power cycled. When the switch states read from the EEPROM 514 and the internal memory of the microcontroller 512 match, the state machine 800 controls the isolated drive circuit 520 and the isolated drive circuit 522 to control the switch circuit 519 and the switch circuit 521, respectively, to place the switch circuit 519 and the switch circuit 521 in the read switch state and then proceeds (POWERUP_DONE) to state 806. Alternatively, if the state machine 800 determines that a timer has expired while the microcontroller 512 is on battery power, the state machine 800 proceeds (BATT_TIMER) to state 808 at which a programmed action is performed. In at least some examples, that programmed action is a safe shutdown of the remote device 104 in which the switch circuit 519 and the switch circuit 521 are each controlled to open. In at least some examples, the state machine 800 remains at state 808 until power other than battery power is again applied to the microcontroller 512.

At state 806, the state machine 800 waits to receive a tool identifier. The tool identifier is, in some examples, an identifier of a downstream tool to which the remote device 104 is blocking the transfer of power from the control system. The tool identifier is received, in some examples, from the downlink circuit 816 based on a FSK or FSSK encoded control signal received from a control system and decoded by the downlink circuit 516 to binary bits that are provided to the microcontroller 512 and state machine 800. When the tool identifier is invalid, the state machine 800 remains (SAME_STATE) at the state 806. When the tool identifier is valid, the state machine 800 proceeds (VALID_MESSAGE) to state 810.

At state 810, the state machine 800 waits to receive a command. The command is, in some examples, a command to provide power to the tool identified by the tool identifier. In other various examples, the command is any suitable command for which the microcontroller 512 and/or state machine 800 are programmed. The command is received, in some examples, from the downlink circuit 516 based on a FSK or FSSK encoded control signal (either the same control signal as at state 808 or a new control signal) received from the control system and decoded by the downlink circuit 516 to binary bits that are provided to the microcontroller 512 and state machine 800. When no command has yet been received, the state machine 800 remains (SAME_STATE) at the state 810. When the command is invalid, the state machine 800 controls the uplink circuit 518 to transmit a response to the control system indicating that an invalid command was received and then proceeds (INVALID_COMMAND) back to the state 808. When the command is valid, the state machine 800 proceeds (VALID_COMMAND) to state 812.

At state 812, the state machine 800 executes the command received at state 810. In some examples, executing the command includes communicating with a downstream device and waiting for a response from the downstream device. In other examples, executing the command includes controlling the isolated drive circuit 520 and the isolated drive circuit 522 to control the switch circuit 519 and the switch circuit 521, respectively, to place the switch circuit 519 and the switch circuit 521 in a state indicated by the command. After executing the command, the state machine 800 controls the uplink circuit 518 to transmit a response associated with the command to the control system and then proceeds (TRANSMIT_DONE) back to the state 806.

In at least some examples, of the state machine 800, the state 806 is omitted. In such an example, the state machine 800 may proceed from the state 802 to the state 810 under the same conditions in which the state machine 800 would proceed from state 802 to state 806 in the above description. Also, in such an example, the state machine 800 may remain (SAME_STATE) at the state 810, or return to the state 820, in response to receiving an invalid command at the state 810.

Further in the example of the state machine 800 in which the state 806 is omitted, the state 812 may proceed after transmission (TRANSMIT_DONE) to the state 810 under the same conditions in which the state machine 800 would proceed from state 812 to state 806 in the above description.

While a communication scheme between a control system and a remote device has been described herein, a similar communication may also be implemented in a substantially similar manner between a remote device and a downstream device. For example, a control system may query a remote device that may then itself query one or more downstream devices and/or other remote devices, which may themselves query one or more downstream devices and/or yet other remote devices. The first remote device may receive responses from the queried one or more downstream devices and/or other remote devices and report those responses to the control system. Thus, a number of communication roundtrips between the control system and downstream devices is reduced, correspondingly reducing an amount of time consumed in the control system receiving information from multiple of the downstream devices. Such a communication scheme, utilizing at least some of the teachings of the present disclosure, is included within the scope of the present disclosure. The remote device may power the downstream device and also include communication with the downstream device using digital encoding only, e.g., sending digital data directly. The current embodiment of the downstream devices can also decode digital data when fed into node 536.

Various systems and methods associated with control devices, communication protocols, and downhole systems are described herein. Certain aspects of a safety sub system can include, but are not limited to:

In a first aspect, a safety sub for use with one or more downhole tools comprises: a processor, a memory; and a control program stored in the memory that, when executed on the processor, configures the processor to: receive power from a wireline coupled to the safety sub; read one or more switch statuses from the memory; receive, from a control unit, a tool ID; validate the tool ID and the one or more switch statuses; receive, from the control unit, a command signal; validate the command signal; determine that the tool ID, the one or more switch statuses, and the command signal are valid; and communicate with one or more downhole tools in response to the determination that the tool ID, the one or more switches, and the command signal are valid, wherein the safety sub is disposed between the control unit and the one or more downhole tools.

A second aspect can include the safety sub of the first aspect, further comprising: sending, to the control unit, a confirmation of the communication with the one or more downhole tools.

A third aspect can include the safety sub of the first or second aspect, further comprising: one or more isolation drives, wherein the control program further configures the processor to: isolate the control unit from the one or more downhole tools using the one or more isolation drives when the tool ID, the one or more switch statuses, or the command signal are invalid.

A fourth aspect can include the safety sub of the third aspect, wherein the one or more isolation drives comprise an air or iron core transformer configured to be driven by an amplifier or an open drain transistor.

A fifth aspect can include the safety sub of the fourth aspect, wherein transformer is configured to deliver a waveform scaled based on a transfer ratio presented at the primary coil.

A sixth aspect can include the safety sub of the fourth aspect, wherein the transformer is configured to be used in forward mode or flyback mode for conversion of a drive signal along the wireline.

A seventh aspect can include the safety sub of the fourth aspect, wherein the transformer is configured to be driven by a microcontroller drive or a separate oscillator.

An eighth aspect can include the safety sub of any one of the first to seventh aspects, wherein the memory comprises an EEPROM.

A ninth aspect can include the safety sub of any one of the first to eighth aspects, further comprising: a rectifier, wherein the rectifier is configured to power the safety sub irrespective of polarity received at the safety sub.

A tenth aspect can include the safety sub of any one of the first to ninth aspects, further comprising: a current interrupt device, wherein the current interrupt device is configured to place the safety sub in a fail-safe mode when an overvoltage is received at the safety sub.

An eleventh aspect can include the safety sub of the tenth aspect, further comprising: an RF shunt, wherein the RF shunt is configured to open the current interrupt device in response to a detected high voltage or RF signal above a threshold.

A twelfth aspect can include the safety sub of any one of the first to eleventh aspects, further comprising: an uplink circuit, wherein the uplink circuit is configured to provide communication between the control unit and the safety sub.

A thirteenth aspect can include the safety sub of any one of the first to twelfth aspects, further comprising: a downlink circuit, wherein the downlink circuit is configured to communicate with the one or more downhole tools.

A fourteenth aspect can include the safety sub of any one of the first to thirteenth aspects, further comprising: a protection circuit, wherein the protection circuit is configured to isolate the control system of the safety sub in the event of a damaging signal.

A fifteenth aspect can include the safety sub of any one of the first to fourteenth aspects, further comprising: a protection device, wherein the protection device comprises one or more semiconductor switches configured to limit the voltage and current from reaching the output of the safety sub.

A sixteenth aspect can include the safety sub of the fifteenth aspect, wherein the semiconductor switches comprise Silicon, Silicon On Insulator, Silicon Carbide, Gallium Nitride, or any combination thereof.

A seventeenth aspect can include the safety sub of any one of the first to sixteenth aspects, further comprising: a self-test circuit, wherein the self-test circuit is configured to check an integrity of semiconductor protection components.

An eighteenth aspect can include the safety sub of any one of the first to seventeenth aspects, further comprising at least one of a voltage sensor or a temperature sensor.

In a nineteenth aspect, a method for providing signal isolation to a tool in a wellbore comprises: receiving, from surface equipment, a signal at a control unit, wherein the control unit is located between the surface equipment and one or more perforating guns; processing the signal with a state machine; controlling a position of one or more switches; and allowing the surface equipment to communicate with one or more perforating guns based on the controlling of the position of the one or more switches.

A twentieth aspect can include the method of the nineteenth aspect, wherein the control unit is located in a tractor.

A twenty first aspect can include the method of the twentieth aspect, wherein the state machine is located between the tractor and the one or more perforating guns.

A twenty second aspect can include the method of any one of the nineteenth to twenty first aspects, further comprising: sending a validation signal to the surface equipment in response to allowing the surface equipment to communicate with the one or more perforating guns.

In a twenty third aspect, a method for validating a function of a downhole tool comprises: receiving a signal at a pre-check controller, wherein the pre-check controller is disposed in a tool string and coupled to one or more control units on one or more downhole tools; verify the functioning of the one or more downhole tools using the pre-check controller; and sending, by the pre-check controller, a validation signal to a surface control unit when the functioning of the one or more downhole tools is verified.

A twenty fourth aspect can include the method of the twenty third aspect, further comprising: inserting the tool string into a wellbore after verifying the functioning of the one or more downhole tools.

A twenty fifth aspect can include the method of any one of the nineteenth to twenty fourth aspects, further comprising: turning on the control unit after a predetermined amount of time, wherein receiving the signal at the control unit occurs after turning on the control unit.

In a twenty sixth aspect, a safety device for use with one or more end devices comprises: a processor, a memory; and a control program stored in the memory that, when executed on the processor, configures the processor to: receive power from a communication line coupled to the safety device; read one or more switch statuses from the memory; receive, from a control unit, a device ID; validate the device ID and the one or more switch statuses; receive, from the control unit, a command signal; validate the command signal; determine that the device ID, the one or more switch statuses, and the command signal are valid; and communicate with one or more end devices in response to the determination that the device ID, the one or more switches, and the command signal are valid, wherein the safety device is disposed between the control unit and the one or more end devices.

A twenty seventh aspect can include the safety device of the twenty sixth aspect, further comprising: sending, to the control unit, a confirmation of the communication with the one or more end devices.

A twenty eighth aspect can include the safety device of the twenty sixth or twenty seventh aspect, further comprising: one or more isolation drives, wherein the control program further configures the processor to: isolate the control unit from the one or more end devices using the one or more isolation drives when the device ID, the one or more switch statuses, or the command signal are invalid.

A twenty ninth aspect can include the safety device of the twenty eighth aspect, wherein the one or more isolation drives comprise an air or iron core transformer configured to be driven by an amplifier or an open drain transistor.

A thirtieth aspect can include the safety device of the twenty ninth aspect, wherein transformer is configured to deliver a waveform scaled based on a transfer ratio presented at the primary coil.

A thirty first aspect can include the safety device of the twenty ninth aspect, wherein the transformer is configured to be used in forward mode or flyback mode for conversion of a drive signal along the communication line.

A thirty second aspect can include the safety device of the twenty ninth aspect, wherein the transformer is configured to be driven by a microcontroller drive or a separate oscillator.

A thirty third aspect can include the safety device of any one of the twenty sixth to thirty second aspects, wherein the memory comprises an EEPROM.

A thirty fourth aspect can include the safety device of any one of the twenty sixth to thirty third aspects, further comprising: a rectifier, wherein the rectifier is configured to power the safety device irrespective of polarity received at the safety device.

A thirty fifth aspect can include the safety device of any one of the twenty sixth to thirty fourth aspects, further comprising: a current interrupt device, wherein the current interrupt device is configured to place the safety device in a fail-safe mode when an overvoltage is received at the safety device.

A thirty sixth aspect can include the safety device of the thirty fifth aspect, further comprising: an RF shunt, wherein the RF shunt is configured to open the current interrupt device in response to a detected high voltage or RF signal above a threshold.

A thirty seventh aspect can include the safety device of any one of the twenty sixth to thirty sixth aspects, further comprising: an uplink circuit, wherein the uplink circuit is configured to provide communication between the control unit and the safety device.

A thirty eighth aspect can include the safety device of any one of the twenty sixth to thirty seventh aspects, further comprising: a downlink circuit, wherein the downlink circuit is configured to communicate with the one or more end devices.

A thirty ninth aspect can include the safety device of any one of the twenty sixth to thirty eighth aspects, further comprising: a protection circuit, wherein the protection circuit is configured to isolate the control system of the safety device in the event of a damaging signal.

A fortieth aspect can include the safety device of any one of the twenty sixth to thirty ninth aspects, further comprising: a protection device, wherein the protection device comprises one or more semiconductor switches configured to limit the voltage and current from reaching the output of the safety device.

A forty first aspect can include the safety device of the fortieth aspect, wherein the semiconductor switches comprise Silicon, Silicon On Insulator, Silicon Carbide, Gallium Nitride, or any combination thereof.

A forty second aspect can include the safety device of any one of the twenty sixth to forty first aspects, further comprising: a self-test circuit, wherein the self-test circuit is configured to check an integrity of semiconductor protection components.

A forty third aspect can include the safety device of any one of the twenty sixth to forty second aspects, further comprising at least one of a voltage sensor or a temperature sensor.

In a forty fourth aspect, a method for providing signal isolation to an end device comprises: receiving, from a controller unit, a signal at a control unit, wherein the control unit is located between the controller unit and one or more end units; processing the signal with a state machine; controlling a position of one or more switches; and allowing the controller unit to communicate with one or more end units based on the controlling of the position of the one or more switches.

A forty fifth aspect can include the method of the forty fourth aspect, wherein the control unit is located in a programmable detonator.

A forty sixth aspect can include the method of the forty fifth aspect, wherein the state machine is located between the programmable detonator and the one or more end units.

A forty seventh aspect can include the method of any one of the forty fourth to forty sixth aspects, further comprising: sending a validation signal to the controller unit in response to allowing the controller unit to communicate with the one or more end units.

In a forty eighth aspect, a method for validating a function of an end unit comprises: receiving a signal at a pre-check controller, wherein the pre-check controller is coupled to one or more control units on one or more end units; verify the functioning of the one or more end units using the pre-check controller; and sending, by the pre-check controller, a validation signal to a controller unit when the functioning of the one or more end units is verified.

A forty ninth aspect can include the method of the forty eighth aspect, further comprising: inserting the end units into a mine after verifying the functioning of the one or more end units.

A fiftieth aspect can include the method of any one of the forty fourth to forty ninth aspects, further comprising: turning on the control unit after a predetermined amount of time, wherein receiving the signal at the control unit occurs after turning on the control unit.

Certain aspects of a downhole communications system can include, but are not limited to:

In a first aspect, a method for compensating the communication frequencies comprises: measuring a downhole time base of a received responses from a downhole unit; determining a shift in the downhole time based of the received response; and adjusting a surface communication time base to match that of the downhole unit.

A second aspect can include the method of the first aspect, wherein adjusting the surface communication time base uses frequency scaled shift keying to shift mark and space frequencies by a same percentage as the shift in the downhole time base.

A third aspect can include the method of the first or second aspects, wherein adjusting the surface communication time base comprises matching a change in a reference time base of the downhole unit due to temperature effects on the downhole unit.

A fourth aspect can include the method of any one of the first to third aspects, wherein adjusting the surface communication time base comprises: adjusting a transition boundary between a mark and space frequency or between a space and mark frequency.

A fifth aspect can include the method of the fourth aspect, wherein adjusting the transition boundary comprises: changing an amplitude of a waveform at the transition boundary.

A sixth aspect can include the method of any one of the first to fifth aspects, further comprising: reducing or nullify communication errors based on the adjusting of the surface communication time base.

In a seventh aspect, a method of compensating communications from downhole devices to a surface unit comprises: generating, at a downhole device, a signal; varying an amplitude at a transition boundary of the signal from a current encoding unit to provide a shaped signal; and transmitting the shaped signal to the surface unit.

An eighth aspect can include the method of the seventh aspect, wherein the current encoding unit uses Manchester encoding.

A ninth aspect can include the method of the seventh or eighth aspect, wherein varying the amplitude at the transition boundary is configured to overcome a cable impedance of a cable connecting the downhole device and the surface unit.

A tenth aspect can include the method of any one of the seventh to ninth aspects, further comprising: applying power to the downhole device while transmitting the shaped signal to the surface unit, wherein the power is sufficient to initiate a perforating charge.

An eleventh aspect can include the method of the tenth aspect, wherein the power is greater than a magnitude of the shaped signal.

A twelfth aspect can include the method of any one of the seventh to eleventh aspects, wherein the downhole device comprises at least one of: a selectively fired perforating gun, a setting tool, a pressure sensing tool, a Gamma-Ray, a Digital CCL, a release device, or a downhole sensor.

A thirteenth aspect can include the method of any one of the seventh to twelfth aspects, wherein the downhole device comprises an addressing system.

In a fourteenth aspect, a method for checking a downhole device, the method comprising: sending a signal to one or more control units located on the downhole device in the tool string; identifying a status of each control unit; processing the signal with the appropriate commands; determining that the downhole device is functioning based on the processing; and lowering the downhole device into a wellbore in response to determining that the downhole device is functioning.

A fifteenth aspect can include the method of the fourteenth aspect, wherein identifying the status of each control unit comprises: processing, by the control unit for each downhole device, a signal; sending, from the control unit to a surface unit, a validation signal; and receiving, by the surface unit, the validation signal from the control unit for the downhole device.

A sixteenth aspect can include the method of the fourteenth or fifteenth aspect, further comprising: scaling, by the surface unit, a waveform and shape of an instruction signal; sending, from the surface unit to the control unit, the instruction signal to perform a function while the downhole device is within the wellbore.

In a seventeenth aspect, a method for compensating the communication frequencies comprises: measuring a time base of a received responses from an end unit; determining a shift in the time base based of the received response; and adjusting a controller communication time base to match that of the end unit.

An eighteenth aspect can include the method of the seventeenth aspect, wherein adjusting the controller communication time base uses frequency scaled shift keying to shift mark and space frequencies by a same percentage as the shift in the time base of the end unit.

An nineteenth aspect can include the method of the seventeenth or eighteenth aspect, wherein adjusting the controller communication time base comprises matching a change in a reference time base of the end unit due to temperature effects on the end unit.

A twentieth aspect can include the method of any one of the seventeenth to nineteenth aspects, wherein adjusting the controller communication time base comprises: adjusting a transition boundary between a mark and space frequency or between a space and mark frequency.

A twenty first aspect can include the method of the twentieth aspect, wherein adjusting the transition boundary comprises: changing an amplitude of a waveform at the transition boundary.

A twenty second aspect can include the method of any one of the seventeenth to twenty first aspects, further comprising: reducing or nullify communication errors based on the adjusting of the controller communication time base.

In a twenty third aspect, a method of compensating communications from an end devices to a controller unit comprises: generating, at an end device, a signal; varying an amplitude at a transition boundary of the signal from a current encoding unit to provide a shaped signal; and transmitting the shaped signal to the controller unit.

A twenty fourth aspect can include the method of the twenty third aspect, wherein the current encoding unit uses Manchester encoding.

A twenty fifth aspect can include the method of the twenty third or twenty fourth aspect, wherein varying the amplitude at the transition boundary is configured to overcome a cable impedance of a cable connecting the end device and the controller unit.

A twenty sixth aspect can include the method of any one of the twenty third to twenty fifth aspects, further comprising: applying power to the end device while transmitting the shaped signal to the controller unit, wherein the power is sufficient to initiate a blasting charge.

A twenty seventh aspect can include the method of the twenty sixth aspect, wherein the power is greater than a magnitude of the shaped signal.

A twenty eighth aspect can include the method of any one of the twenty third to twenty seventh aspects, wherein the end device comprises at least one of: a selectively fired blasting charge, or a pressure sensing tool.

A twenty ninth aspect can include the method of any one of the twenty third to twenty eighth aspects, wherein the end device comprises an addressing system.

In a thirtieth aspect, a method for checking an end device comprises: sending a signal to one or more control units located on the end device; identifying a status of each control unit; processing the signal with the appropriate commands; determining that the end device is functioning based on the processing; and placing the end device into a mine shaft in response to determining that the end device is functioning.

A thirty first aspect can include the method of the thirtieth aspect, wherein identifying the status of each control unit comprises: processing, by the control unit for each end device, a signal; sending, from the control unit to a controller unit, a validation signal; and receiving, by the controller unit, the validation signal from the control unit for the end device.

A thirty second aspect can include the method of the thirtieth or thirty first aspect, further comprising: scaling, by the controller unit, a waveform and shape of an instruction signal; and sending, from the controller unit to the control unit, the instruction signal to perform a function while the end device is within the mine shaft.

In the foregoing discussion and in the claims, the terms "including" and "comprising" are used in an open-ended fashion, and thus mean "including, but not limited to . . . ."

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

An element or feature that is "configured to" perform a task or function may be configured (e.g., programmed or structurally designed) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Additionally, uses of the phrases "ground" or similar in the foregoing discussion include a chassis ground, an Earth ground, a floating ground, a virtual ground, a digital ground, a common ground, and/or any other form of ground connection applicable to, or suitable for, the teachings of the present disclosure. Unless otherwise stated, "about," "approximately," or "substantially" preceding a value means +/−10 percent of the stated value.

The above discussion is illustrative of the principles and various embodiments of the present disclosure. Numerous variations and modifications will become apparent to those skilled in the art once the above disclosure is fully appreciated. The following claims should be interpreted to embrace all such variations and modifications.

What is claimed is:

1. A method implemented by a control system for communicating with a remote device comprises:
    determining a frequency of operation of the remote device;
    determining whether the frequency of operation of the remote device varies from a programmed frequency;
    determining a frequency scaling factor based on whether the frequency of operation of the remote device varies from a programmed frequency;
    generating a frequency shift keying (FSK) signal;
    scaling the FSK signal to generate a frequency scaled shift keying (FSSK) signal; and
    transmitting the FSSK signal to the remote device, wherein transmitting the FSSK signal to the remote device comprises superimposing the FSSK signal as an alternating current signal on a power signal provided to the remote device via a wireline.

2. The method of claim 1, wherein determining the frequency of operation of the remote device comprises:
    transmitting calibration command message to the remote device;
    receiving a response message from the remote device, the response message responsive to the calibration command message; and
    determining a time base of the response message.

3. The method of claim 1, wherein the frequency scaling factor compensates at the control system for variation in the frequency of operation of the remote device from the programmed frequency.

4. The method of claim 3, wherein the frequency scaling factor compensates at the control system for variation in the frequency of operation of the remote device from the programmed frequency compensated for effects of environmental or operating temperature on the frequency of operation of the remote device.

5. The method of claim 1, wherein scaling the FSK signal to generate the FSSK signal comprises shifting mark and space frequencies by a same percentage as a variance in the frequency of operation of the remote device from the programmed frequency.

6. The method of claim 1, further comprising shaping the FSSK signal prior to transmitting the FSSK signal to the remote device.

7. The method of claim 6, wherein shaping the FSSK signal comprises varying an amplitude of the FSSK signal at a transition boundary of the FSSK signal for a predetermined number of marks of the FSSK signal.

8. The method of claim 7, wherein shaping the FSSK signal reduces an amount of signal loss of the FSSK signal resulting from capacitance of a wireline via which the control system communicates with the remote device.

9. The method of claim 1, wherein the FSSK signal comprises a command for the remote device to toggle a switch state of a switch blocking the control system from communicating with a device downstream from the remote device on a wireline coupling the control system, the remote device, and the downstream device.

10. A control system, comprising:
    a microcontroller including a memory; and
    executable code stored as firmware in the memory that, when executed by the microcontroller, configures the microcontroller to:
    generate a frequency shift keying (FSK) signal including a command for a remote device;
    condition the FSK signal according to operating characteristics of the remote device and characteristics of a communication channel coupling the control system to the remote device to generate a conditioned FSK signal;
    transmit the conditioned FSK signal to the remote device via the communication channel;
    determine a time base of a message received from the remote device;
    determine whether the time base of the message received from the remote device varies from a time base of the control system; and
    scale the FSK signal to generate the conditioned FSK signal as a frequency scaled shift keying (FSSK) signal based on a variance between the time base of the message received from the remote device and the time base of the control system.

11. The control system of claim 10, wherein scaling the FSK signal to generate the FSSK signal comprises shifting mark and space frequencies by a same percentage as a variance in the frequency of operation of the remote device from the programmed frequency.

12. The control system of claim 10, wherein the executable code further configures the microcontroller to vary an amplitude of the conditioned FSK signal at a transition boundary of the conditioned FSK signal for a predetermined number of marks of the conditioned FSK signal.

13. The control system of claim 10, wherein the executable code further configures the microcontroller to shape the FSK signal to generate the conditioned FSK signal.

14. The control system of claim 13, wherein shaping the FSK signal comprises varying an amplitude of the FSK signal at a transition boundary of the FSK signal for a predetermined number of marks of the FSK signal to generate the conditioned FSK signal.

15. A control system, comprising:
    a microcontroller including a memory; and
    executable code stored as firmware in the memory that, when executed by the microcontroller, configures the microcontroller to:

generate a frequency shift keying (FSK) signal including a command for a remote device;

condition the FSK signal according to operating characteristics of the remote device and characteristics of a communication channel coupling the control system to the remote device to generate a conditioned FSK signal; and transmit the conditioned FSK signal to the remote device via the communication channel, wherein environmental conditions surrounding the remote device modify a time base of communication of the remote device, and wherein condition the FSK signal according to the operating characteristics of the remote device synchronizes a time base of communication of the control system to time base of communication of the remote device.

16. The control system of claim 15, wherein the communication channel introduces error into communications between the control system and the remote device by attenuating the communications, and wherein conditioning the FSK signal according to the characteristics of the communication channel reduces the errors introduced into the communications.

17. The control system of claim 15, wherein the executable code further configures the microcontroller to receive a response message from the remote device via the communication channel, wherein the response message is a Manchester encoded message.

18. The control system of claim 17, wherein the Manchester encoded message comprises pre-emphasis configured to reduce errors introduced into communications between the control system and the remote device resulting from the communication channel attenuating the communications.

* * * * *